US007616224B2

(12) United States Patent
Kaneko

(10) Patent No.: US 7,616,224 B2
(45) Date of Patent: Nov. 10, 2009

(54) PROCESS OF PRODUCING KEY UNITS WHEREIN MARKING ON THEIR TOPS MADE OF LIGHT-TRANSMITTING MATERIAL CAN BE COMPLETED LATER ON

(75) Inventor: Takehiro Kaneko, Ibaraki (JP)

(73) Assignee: Sunarrow Limited, Tokyo (JP)

( * ) Notice: Subject to any disclaimer, the term of this patent is extended or adjusted under 35 U.S.C. 154(b) by 371 days.

(21) Appl. No.: 10/542,691

(22) PCT Filed: Dec. 25, 2003

(86) PCT No.: PCT/JP03/16770

§ 371 (c)(1),
(2), (4) Date: Jul. 19, 2005

(87) PCT Pub. No.: WO2004/068519

PCT Pub. Date: Aug. 12, 2004

(65) Prior Publication Data

US 2006/0042071 A1 Mar. 2, 2006

(30) Foreign Application Priority Data

| | | |
|---|---|---|
| Jan. 30, 2003 | (JP) | 2003-021276 |
| May 26, 2003 | (JP) | 2003-147384 |
| May 26, 2003 | (JP) | 2003-147385 |
| Jul. 14, 2003 | (JP) | 2003-196189 |
| Jul. 14, 2003 | (JP) | 2003-196190 |
| Jul. 14, 2003 | (JP) | 2003-196191 |
| Jul. 14, 2003 | (JP) | 2003-196192 |

(51) Int. Cl.
*H01S 4/00* (2006.01)

(52) U.S. Cl. ....................... 347/224; 29/592.1; 156/230; 156/272.2; 156/277; 347/171; 216/52

(58) Field of Classification Search .............. 156/272.2, 156/230, 272.8, 277; 347/171, 224; 29/592.1; 264/405, 482; 216/52; 451/75
See application file for complete search history.

(56) References Cited

U.S. PATENT DOCUMENTS 2,530,453 A * 11/1950 Eagle ............................ 2/247

(Continued)

FOREIGN PATENT DOCUMENTS

JP 05-237673 A 9/1993

(Continued)

OTHER PUBLICATIONS

Machine Translation of JP11191333A, Date Unavaliable.*

*Primary Examiner*—John L Goff
*Assistant Examiner*—Daniel McNally
(74) *Attorney, Agent, or Firm*—Frishauf, Holtz, Goodman & Chick, P.C.

(57) ABSTRACT

A method is provided for marking a key top made of a translucent material with a character, a symbol, or the like, and a process is provided for quickly producing an illumination key unit. The inside of a transparent plastic key top is irradiated intermittently with focused laser light having a wavelength belonging to near infrared region of 1064 nm or less, visible region or near ultraviolet region to form an aggregation of multiple fine carbonization black points and an aggregation of points whitened by fine cracks or bubbling representing a character, a symbol, or the like. After a process capable of being carried out without determining a destination has ended, production is interrupted temporarily or ended and marking is performed by irradiating the top surface of the key top with laser light upon determination of a character, a symbol, or the like, related with the destination.

13 Claims, 21 Drawing Sheets

U.S. PATENT DOCUMENTS

| | | | | | |
|---|---|---|---|---|---|
| 4,307,047 | A | * | 12/1981 | Edinger et al. | 264/478 |
| 4,519,721 | A | * | 5/1985 | Gardner | 400/472 |
| 4,551,717 | A | * | 11/1985 | Dreher | 345/170 |
| 4,898,765 | A | * | 2/1990 | Sato et al. | 428/195.1 |
| 4,980,221 | A | * | 12/1990 | Kobayashi et al. | 428/195.1 |
| 5,515,045 | A | * | 5/1996 | Tak | 341/23 |
| 6,036,326 | A | | 3/2000 | Yoshikawa et al. | |
| 6,084,190 | A | * | 7/2000 | Kenmochi | 200/341 |
| 6,677,545 | B2 | * | 1/2004 | Kenmochi | 200/314 |
| 6,743,486 | B1 | * | 6/2004 | Miyazawa | 427/596 |
| 2002/0039706 | A1 | | 4/2002 | Kamimura et al. | |
| 2002/0077042 | A1 | * | 6/2002 | Izawa et al. | 451/75 |
| 2003/0108375 | A1 | * | 6/2003 | Nichol et al. | 400/490 |

FOREIGN PATENT DOCUMENTS

| | | | | |
|---|---|---|---|---|
| JP | 05-282956 | A | | 10/1993 |
| JP | 10-101379 | A | | 4/1998 |
| JP | 10-242340 | A | | 9/1998 |
| JP | 11-066997 | A | | 3/1999 |
| JP | 11-111099 | A | | 4/1999 |
| JP | 11191333 | A | * | 7/1999 |
| JP | 2000-141902 | A | | 5/2000 |
| JP | 2000-268661 | A | | 9/2000 |
| JP | 3074287 | U | | 10/2000 |
| JP | 2000-306453 | A | | 11/2000 |
| JP | 2000306453 | A | * | 11/2000 |
| JP | 2002-202805 | A | | 7/2002 |
| JP | 2002-244711 | A | | 8/2002 |
| JP | 2002-270059 | A | | 9/2002 |
| JP | 2003-015722 | A | | 1/2003 |
| JP | 2003-321616 | A | | 11/2003 |

* cited by examiner (A)

(B)

(C)

(A)

(B)

(C)

PROCESS OF PRODUCING KEY UNITS WHEREIN MARKING ON THEIR TOPS MADE OF LIGHT-TRANSMITTING MATERIAL CAN BE COMPLETED LATER ON

This application is a U.S. National Phase Application under 35 USC 371 of International Application JP/JP2003/16770 filed Dec. 25, 2003.

TECHNICAL FIELD

The present invention relates to an illuminated key unit useful as an indicator and controller of mobile devices such as portable telephones and personal digital assistant (PDA) devices and other general machinery, wherein the process for plotting characters, symbols, etc. in each key of the key unit can be completed after their respective destinations were decided.

BACKGROUND ART

The key unit is a kind of element constituting a mobile device and has a multiplicity of keys (push buttons) for operating switches, respectively, assembled and arranged on the surface of a sheet. Each key is composed of a key pad which is made of a soft rubber or a thermoplastic elastomer and a key top which is made of a rigid material and is attached onto the surface of the key pad. The key pad has a projection for pressing the switch (so-called "pusher") formed on the rear face. The keys in each horizontal row are connected to each other through the key pad. Since each key is illuminated by a light source provided under the key pad (referred to as "illuminated key"), light-transmitting materials are used for the key top and the key pad. An illuminated key switch is fabricated if a circuit board containing light sources and having switch elements arranged to oppose the respective switch-pressing projections of the associated keys is brought into intimate contact with the lower face of the thus constituted key unit.

When an illuminated key unit is to be produced, key tops and a key pad are formed in separate steps respectively, and then they are assembled by bonding them together with an adhesive. Alternatively, key tops are formed first and are inserted into an injection mold to form a key pad by means of insert molding. It is necessary to plot on the key tops characters, symbols, etc. representing the functions of the respective keys. This step is referred to as "marking." Generally, marking is applied, for example, to the upper face (referred also to as "top face") or lower face (bottom face) of each key top, or inside the key top. When marking is to be applied to the top face, measures should be taken to secure abrasion resistance of the characters, symbols, etc. marked on the key top. On the other hand, the key tops may be opaque, and marking can be carried out after bonding of the key tops to the key pad. When marking is to be applied to the bottom face, it is essential that the key top is transparent and that marking should be completed before the key tops are bonded to the key pad. To that end, the content of the characters, symbols, etc. to be marked must be defined before bonding of the key tops to the key pad.

While mobile devices including portable telephones are shipped to different language regions of all over the world, the days counting from determination of the destination to shipping is extremely limited. Of a number of elements constituting a mobile device, those elements excluding the key unit which are not related to the language used in the destination can be assembled before the destination is determined. However, in the case of key unit, although some markings including those of numerical characters which are not related to the relevant language can be applied beforehand, it is impossible to apply final marking and complete production of the key unit in the state where the language is not determined and there is still any unconfirmed element in the content of the characters, symbols, etc. to be marked. Nevertheless, it is too late to start production of key units after determination of the destination, whereas stock production of key units in many different languages beforehand leads to glut, disadvantageously.

The problems described above are only some of those generally observable in the system of build-to-order manufacturing, and there are some conventional technologies directed to solving similar problems. For example, in the patent literatures listed below, Patent Literature 1 relates to curtailment of lead time; Patent Literature 2 relates to information service of delivery schedule according to few-day base; and Patent Literature 3 relates to utilization of parts lists per model:

Patent Literature 1:

Unexamined Japanese Patent Publication (Kokai) No. 2002-202805

Patent Literature 2:

Unexamined Japanese Patent Publication (Kokai) No. 2002-244711

Patent Literature 3:

Unexamined Japanese Patent Publication (Kokai) No. 2003-015722

A first object to be attained by the present invention is to provide a key top, which permits setting up of the content of characters, symbols, etc. to be plotted on the key top at any time without being subject to limitations of other steps of key unit assembly and which is marked with characters, symbols, etc. such that they have sufficient abrasion resistance and also to provide a marking method for such purposes.

A second object to be attained by the present invention is to find out a material for forming key tops of illuminated key units, which can impart, when marking is applied to the top face of each key top, sufficient abrasion resistance to characters, symbols, etc. marked on the top face of the key top, as well as, to provide a marking method for such purposes and also to find out a method of marking the key top.

A third object to be attained by the present invention is to find out a process for producing an illuminated key unit, which enables completion of the key unit as soon as possible once the destination is determined.

DISCLOSURE OF THE INVENTION

The marking method referred to in the above first object includes the laser method, the blasting method and the impregnation printing method. According to the laser method, the object can be attained by the technique shown in FIGS. 1 and 2. More specifically, in this marking method, a laser beam having a wavelength of 1064 nm or less in the infrared, visible or near ultraviolet region is irradiated intermittently onto a plastic key while the laser beam is focused on a desired position inside the key to form therein an assemblage of a multiplicity of fine carbonized black spots or an assemblage of white spots formed by fine cracks and the like to indicate thereby a character, a symbol or the like. According to this marking method, the content of the character, symbol, etc. can be set up at any time without being subject to limitations of other steps in the key unit assembly.

There are two main reasons for using a laser beam having a wavelength of 1064 nm or less in the above laser marking method: the first reason is that the shorter the wavelength is, the higher becomes the energy of the laser beam relative to longer-wavelength laser beams, provided that they are of the same amplitude; the second reason is that infrared, visible or near ultraviolet light with a short wavelength can be converged with a lens to easily achieve a spot diameter of 30 nm or less, so that such a laser beam is suitable for forming fine carbonized black spots, white spots of fine cracks or white spots obtained by foaming (foaming by separation of side chains of the resin).

However, in the case where infrared (wavelength 10.6 μm) radiated from a $CO_2$ laser is to be utilized as the marking method, the spot diameter cannot be narrowed fully to be unable to form fine carbonized black spots and the like, and if the input power is increased unduly, the plastic keys are melted by the temperature rise, resulting in the failure of achieving competent marking.

According to the blasting marking method, in an illuminated key unit having a key pad made of a light-transmitting elastomer and glass or plastic key tops bonded onto to the key pad, marking is applied by blasting fine abrasive particles at a high speed against the top face of each glass or plastic key top. In attaining the above object of the present invention, the blasting technique may be any of masked blasting using a mask and maskless blasting using no mask.

According to the impregnation printing marking method, marking is applied by means of impregnation printing to the top face of each key top or to the top face of each key top laminated with a resin film.

In order to attain the second object described above, the illuminated key unit according to the present invention contains a key pad made of a light-transmitting rubber or thermoplastic elastomer (hereinafter referred to as "light-transmitting key pad") and key tops bonded to the key pad, wherein each key top is covered on the surface with a multilayer film, which can be printed on by irradiation of a laser beam. A laser beam is irradiated onto the top face of each key top to apply thereto marking of necessary characters, symbols, etc. The thus marked characters, symbols, etc. inside the multilayer film neither come off nor disappear even by application of friction and the like, realizing excellent abrasion resistance.

It should be noted here that the term "light-transmitting" used in the present invention is intended to mean in contrast to "fully light-blocking" and contains the meaning of translucent in the colored, colorless or milky state.

As the multilayer film which can be printed on by irradiation of a laser beam described above, for example, the one as disclosed in the pamphlet of PCT Publication No. 02/30677 (WO0230677) can be used. In the pamphlet, a film having a multilayer structure is disclosed, containing a transparent plastic film with a metal vapor-deposited film formed on the lower face and a colored layer formed with some distance secured from the metal vapor-deposited film. By irradiating a laser beam onto the multilayer film to remove the metal vapor deposited film into a desired pattern, the light reflected by the colored layer or the light transmitted through the colored layer can be seen from the top of the multilayer film through the pattern formed in the metal vapor-deposited film (see FIG. 17).

In order to attain the third object described above, in the process of producing the key unit, production is interrupted once to form a semi-finished product in the state where all of the steps including assembling which are implementable without determination of the destination are finished beforehand. More specifically, the key tops each covered on the surface with the multilayer film are bonded to the light-transmitting key pad to complete assembling of the key unit. For the semi-finished product, what is remaining in this state is only the step of applying marking onto the top face of each key top. As soon as characters, symbols, etc. related to the destination are defined, application of final markings including the characters, symbols, etc. related to the destination is carried out by irradiating a laser beam onto the top face of the key top, thus providing a process of completing the key unit in the shortest period of time after determination of the destination.

BRIEF DESCRIPTION OF THE DRAWINGS

FIG. 5 shows schematic diagrams explaining stepwise the marking step to apply marking onto the top faces of key tops resorting to impregnation printing in a fifth embodiment; in which FIG. 5(A) shows a state where a release paper 16 is brought above in the vicinity of an assembled key unit K; FIG. 5(B) shows a state where the release paper 16 is bonded to the key tops 2 by thermo compression bonding; and FIG. 5(C) shows a state where impregnation printing is completed;

BEST MODE FOR CARRYING OUT THE INVENTION

First Embodiment

There is shown an embodiment, in which a laser is used as marking means, and a transparent plastic is used as a key top material.

Figure 1:
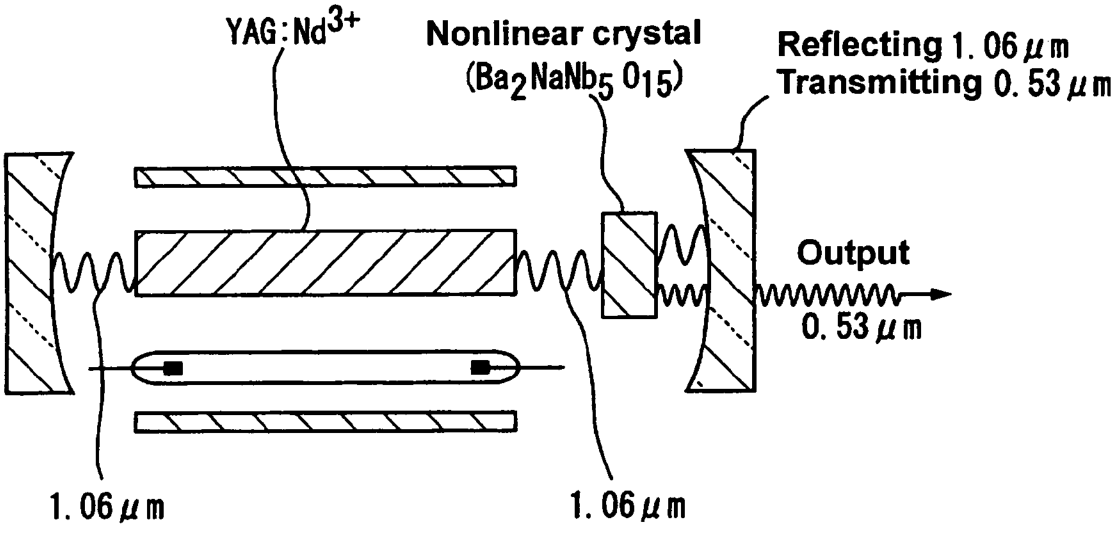
FIG. 1 is a schematic diagram showing the constitution of an SHG YAG laser (green; output:053 μm) using nonlinear crystal which can be employed for marking.
Figure 2:
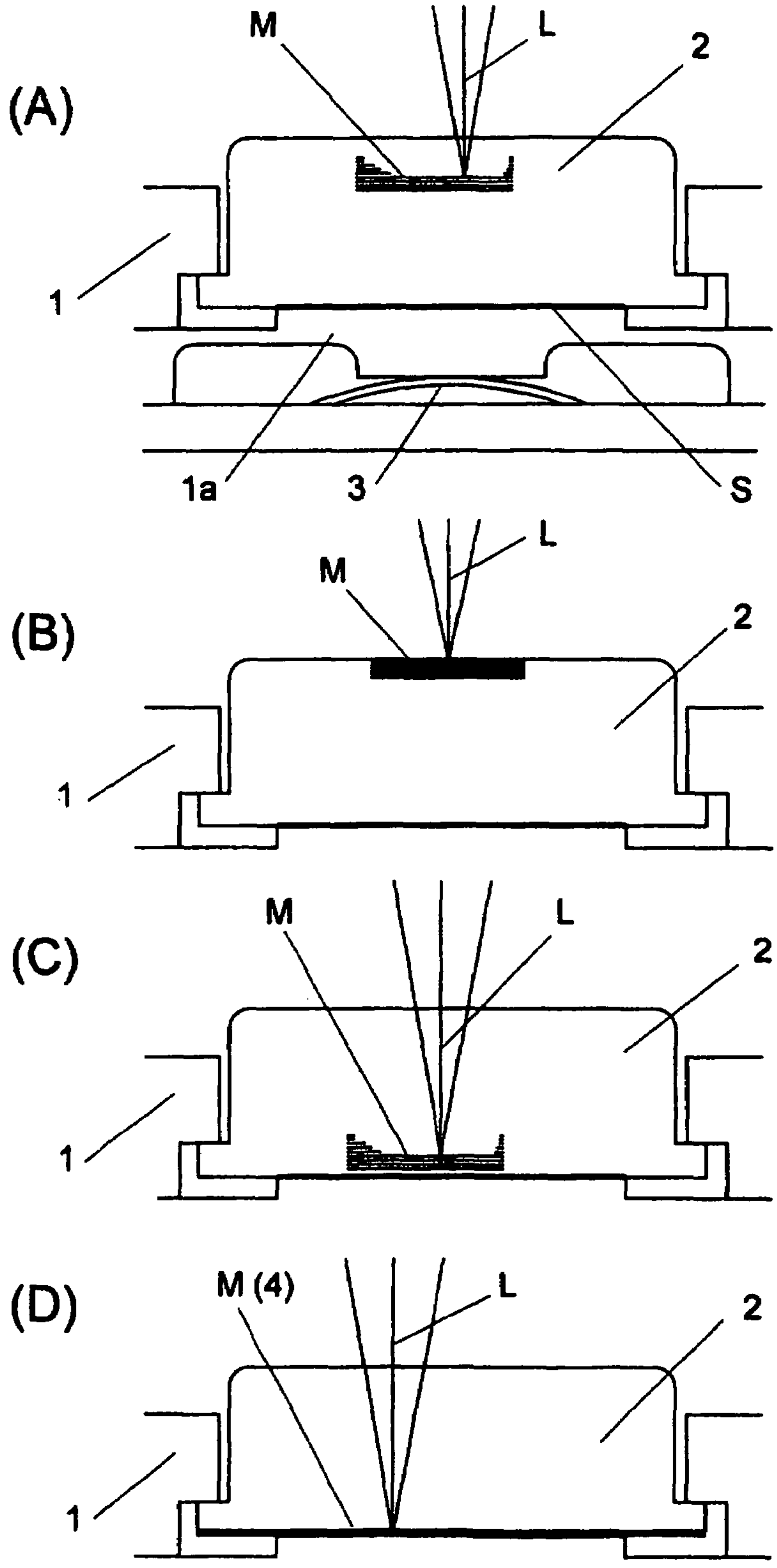
FIG. 2 shows schematic diagrams explaining a first embodiment of the present invention; in which a marking M is formed using a laser beam L in the intermediate layer of a key top 1 in FIG. 2(A), in the uppermost layer of the key top 1 in FIG. 2(B), in the lowermost layer of the key top 1 in FIG. 2(C) and in a printing layer on the rear face of the key top in FIG. 2(D)

A green laser is shown in FIG. 1 as an example of laser beam L. In FIG. 2, the laser beam L was focused on the lowermost stage of the region (upper layer, intermediate layer, lower layer or printing layer) within a key top 2 in which a marking M was to be applied, and the spot diameter of the green laser was narrowed to 10 to 30 μm, followed by irradiation of the laser beam scanning along the planar forms of characters, symbols and the like to be plotted. After completion of irradiation along the plane of the first stage, the focus of the laser beam was shifted to the stage above to repeat irradiation along the plane of that stage. Thus, irradiation was repeated predetermined times corresponding to the number of stages to form three-dimensional assemblages of fine carbonized black spots or of white spots consisting of cracks or foams indicating the desired characters, symbols and the like, respectively. It should be noted here that in the case where a laser beam is irradiated onto the printing layer, neither carbonized black spots nor white spots are formed, but the laser beam pierces a blocking layer to form openings and exposes the color of the coloring layer lying under it through these openings.

When marking is to be applied, the laser beam is focused on the desired position in a transparent plastic medium where a character, symbol or the like is to be marked. When light energy is fed to the focus of the laser beam, carbonization, cracking or foaming is induced in the plastic by an abrupt temperature change to form fine black spots or white spots. The focus of the laser beam is moved two-dimensionally or three-dimensionally following the design of the character, symbol or the like by a computer-controlled reflector system (galvanoscanner) to form an assemblage of fine carbonized black spots or white spots indicating the character, symbol or the like along the track of the laser beam.

As the plastic key having abrasion resistance referred to as the object to be attained, there is given a plastic key, in which characters, symbols and the like are marked as if they are suspended in a plastic medium inside the key top.

In the plastic key descried above, the characters, symbols and the like are blocked from external contact or abrasion, so that the plastic key can give perfect abrasion resistance. Further, since these characters, symbols and the like are seen through lens effect as if they are suspended in the transparent plastic medium each in the form of an assemblage of a multiplicity of fine carbonized black spots or white spots, the plastic key can give a novel visual effect.

In the case where the plastic key is, for example, made of a transparent polycarbonate resin, characters, symbols and the like can be indicated each as an assemblage of a multiplicity of fine carbonized black spots as if it is suspended in the transparent plastic medium.

The embodiment will be explained referring to FIG. 2. In FIG. 2, the reference mark 1 represents a silicone rubber key pad; 2, a key top made of a transparent polycarbonate resin; 3, a dome switch; S, a light-transmitting adhesive between the key top and the key pad; L, a laser beam and M, a marking formed in the key top 2. FIGS. 2(A), 2(B), 2(C) and 2(D) show a state where a marking M is applied to the intermediate layer of the key top 2, in the uppermost layer of the key top 2, in the lowermost layer of the key top 2 and in a printing layer on the rear face of the key top, respectively. The marking M is formed three-dimensionally over several stages along the thickness of the key top.

Second Embodiment

In the case where the above plastic key top 2 is made, for example, of a transparent methyl polyacrylate (acrylic resin), characters, symbols, etc. can be indicated each as an assemblage of white spots formed by a multiplicity of fine cracks as if it is suspended in a transparent plastic medium.

Third Embodiment

As the laser beam, there is used either a beam with a wavelength of 1064 nm, which is a fundamental wave irradiated from a Nd:YAG laser (neodymium ion-doped yttrium aluminum garnet crystal laser), a beam with a wavelength of 532 nm, which is the second harmonic wave, or a beam with a wavelength of 355 nm, which is the third harmonic wave. An apparatus for extracting the second harmonic wave of the Nd:YAG laser is referred to as "an SHG YAG laser" or as "a green laser", since the laser beam with a wavelength of 532 nm irradiated from the apparatus presents green color. FIG. 1 is a schematic diagram showing the constitution of the SHG YAG laser (extracted from H. Kobayashi: "LASER NO HANASHI" 1992/1, THE NIKKAN KOGYO SHIMBUN, LTD.). Further, "a THG YAG laser" for extracting the third harmonic wave has substantially the same constitution as that shown in FIG. 1.

Fourth Embodiment

The laser equipment is not to be limited to the YAG laser. It may be lasers of other solids doped with Nd ion such as glass laser and $YVO_4$ laser or an excimer laser. Further, the higher harmonic wave is not limited to the second harmonic wave or the third harmonic wave, but fourth or higher harmonic wave may be used if it is acceptable in terms of efficiency.

Fifth Embodiment

Another embodiment is illustrated in FIGS. 3 to 7, in which impregnation printing is used as marking means and a transparent resin is used as the key top material.

Since markings to be formed on the top faces of key tops are required to have abrasion resistance, a marking method satisfying the requirement must be used. In the present invention, the impregnation printing method satisfies the requirement. If impregnation printing is applied to the surface of a hard resin key top, a printing ink seeps into the key top to a predetermined depth from the surface thereof to realize excellent abrasion resistance compared with markings formed by the conventional printing methods including screen printing, dispensing with formation of a protecting layer for protecting the marked characters and the like from abrasion. However, since some resins have compatibility to impregnation printing but others do not, and since some resins have suitability for illuminated keys and others do not, an optimum material must be selected taking these aspects into consideration.

Polybutylene terephthalate (PBT) resin has been noted for the suitability for impregnation printing among many other resin materials and besides has excellent properties including abrasion resistance, chemical resistance and molding stability, so that the PBT resin is an excellent material for forming key tops. However, since molded products of the PBT resin are opaque white, the resin is subject to some limitations in that it is not suitable for a design where characters etc. printed on the rear face of the key top is seen through it from the top face. Thus, not all resins are acceptable.

As the fifth embodiment of the present invention, there is given a case where a polyethylene terephthalate (PET) resin or a polyacetal (POM) resin is selected as the key top material. Both of these materials have excellent compatibility to impregnation printing and are transparent or translucent resins, and they also have sufficient surface hardness and are suitably applied to key tops of an illuminated key.

When impregnation printing is to be applied to the resin key tops molded using such resins, there are two possible techniques: one is the heat transfer method and the other is the direct method. In the heat transfer method, a plastic release paper on which characters, symbols, etc. to be printed are plotted with a special ink kneaded together with a subliming dye is placed on the top faces of key tops and is bonded to the by compression at a predetermined temperature for a predetermined time. Thus, the coating component contained in the ink sublimes and vaporizes to seep into the resin to a depth of 30 to 50 μm from the surface, anchoring the characters, symbols, etc. in the surface layer of each key top.

Meanwhile, in the direct method, the same special ink as described above is used for printing characters, symbols, etc. directly onto the top face of each key top by means of pad printing or screen printing, followed by heat treatment under predetermined conditions. Thus, the coating component contained in the ink sublimes and vaporizes to seep into the resin, anchoring the characters, symbols, etc. in the surface layer of each key top like in the heat transfer method.

Figure 3:
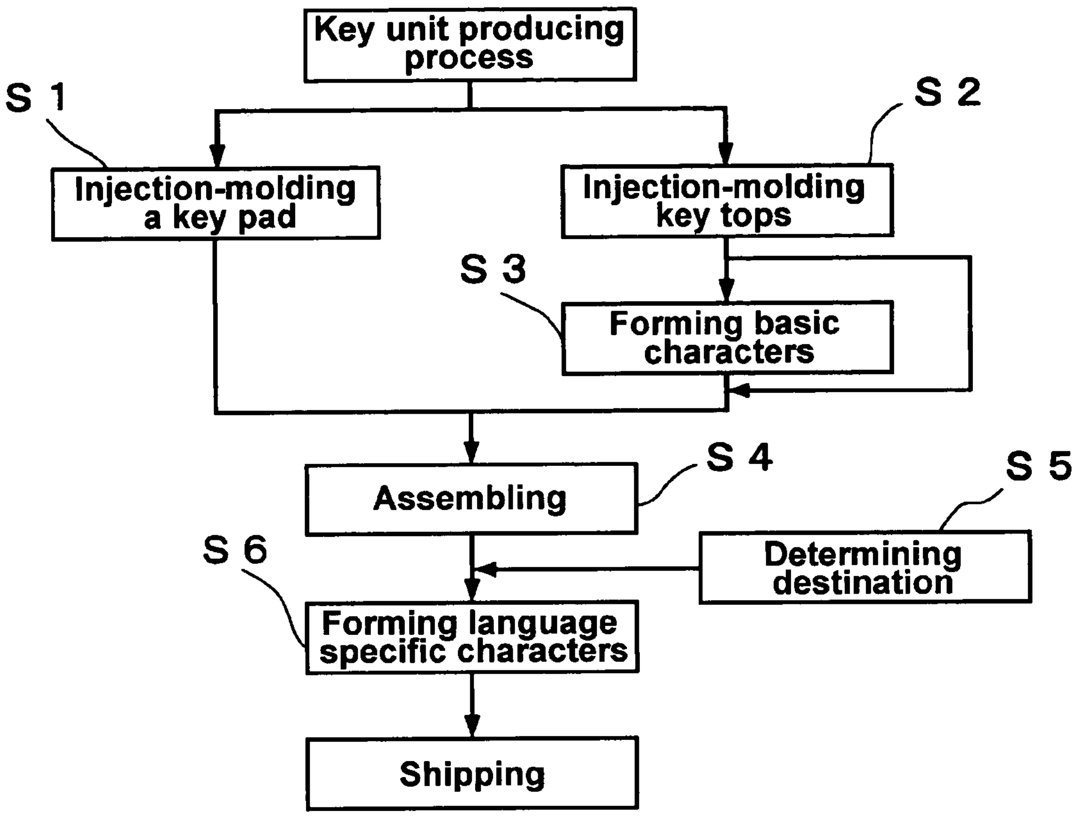
FIG. 3 is a block diagram showing the generalized flow of the production process which is common to each of embodiments of the present invention irrespective of the technique of forming characters.

In FIG. 3, S1 is a step for forming a key pad, S2 is a step for forming key tops, and S3 is a step for writing basic characters etc. onto the surface of each key top, which can be skipped if it is not necessary. S4 is a step for assembling a key unit by bonding the key tops to the top face of the key pad. In S5 destination or the relevant language is determined. S6 represents a step of writing language specific characters and the like onto the top face of each key top.

Figure 4:
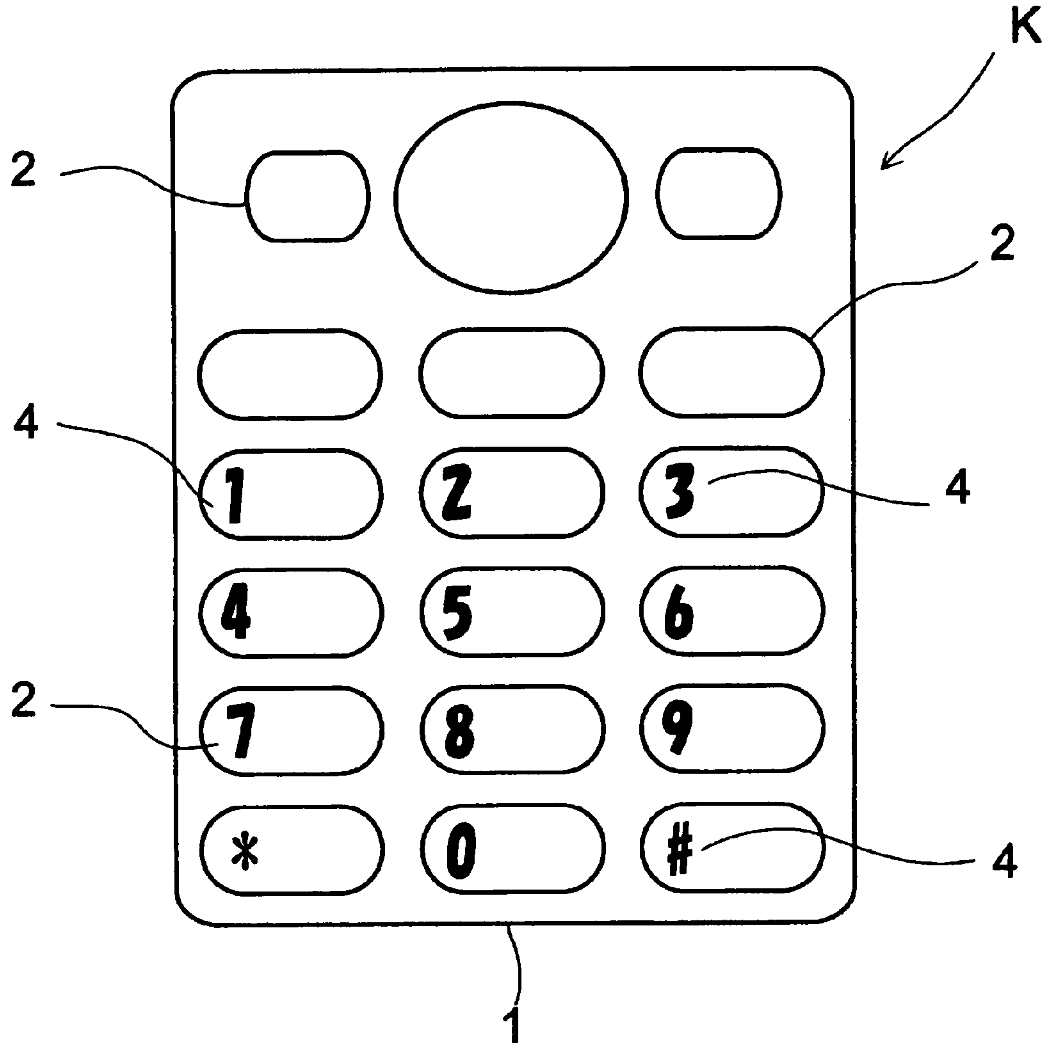
FIG. 4 is a plan view illustrating an example of key unit to be formed in Block S3 "Forming basic characters" in the production process shown in FIG. 3.

In FIG. 4, the reference mark K represents a key unit; 1 and 1*a*, key pads made of a silicone rubber or a thermoplastic elastomer; 2, a key top; 4, a basic character and 5, language specific characters. FIG. 3 is a block diagram showing the process for producing an illuminated key unit K according to the present invention including marking after assembling, as described above. FIG. 4 is a plan view of the key unit K to be formed in the block "Forming basic characters" in FIG. 3.

In the production process according to this embodiment, as shown in FIG. 3, the key tops 2 and the key pad 1 are formed by injection molding in separate steps (S1, S2) respectively, and after formation of numerical characters and the like (basic characters) 4 which are not related to the relevant language (S3, which can be skipped) on the respective key tops 2, the key tops 2 and the key pad 3 are assembled by bonding them together with an adhesive or the like (S4). The ellipsoids or ovals shown in FIG. 4 express key tops 2 made of a transparent hard resin, and basic characters 4 including numerical characters and symbols are formed on the bottom faces of the respective key tops 2. These basic characters 4 are formed as the markings which are not related to the relevant language prior to "Determining destination" (S5) in the above block diagram, and in this state the process of producing the key unit 1 is interrupted or stopped once. In FIG. 4, the basic characters 4 are seen through each key top 2.

When the destination is determined and those elements of characters, symbols, etc. which are related to the relevant language are defined, the process of producing the key unit K is resumed or started, and then the characters, symbols, etc. that are specific to the language of the destination (language specific characters) 5 are marked on the top faces of the respective key tops 2 by impregnation printing (S6). The entire production process is completed by application of this final marking onto the top face of each key top 2. The key unit K thus obtained as a finished product is incorporated into a predetermined mobile device and is shipped to the destination.

Figure 5:
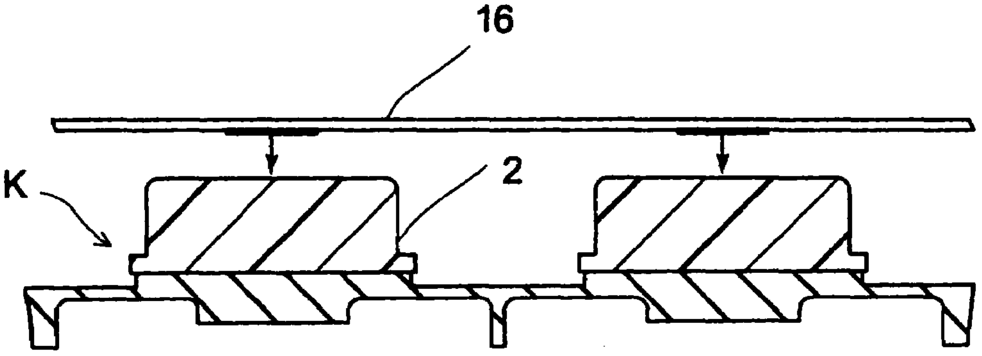
Figure 5:
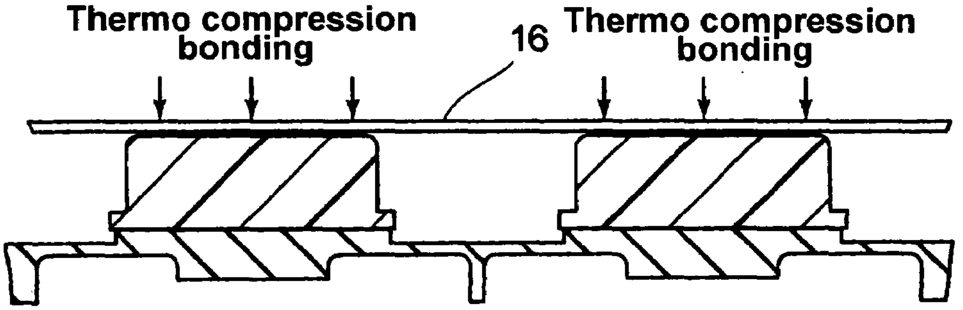
Figure 5:
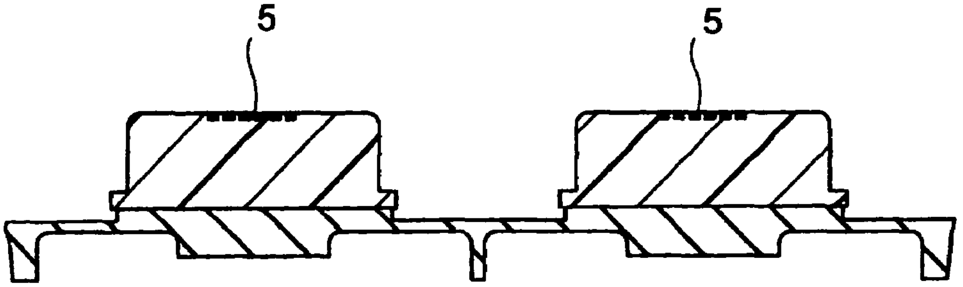
Figure 6:
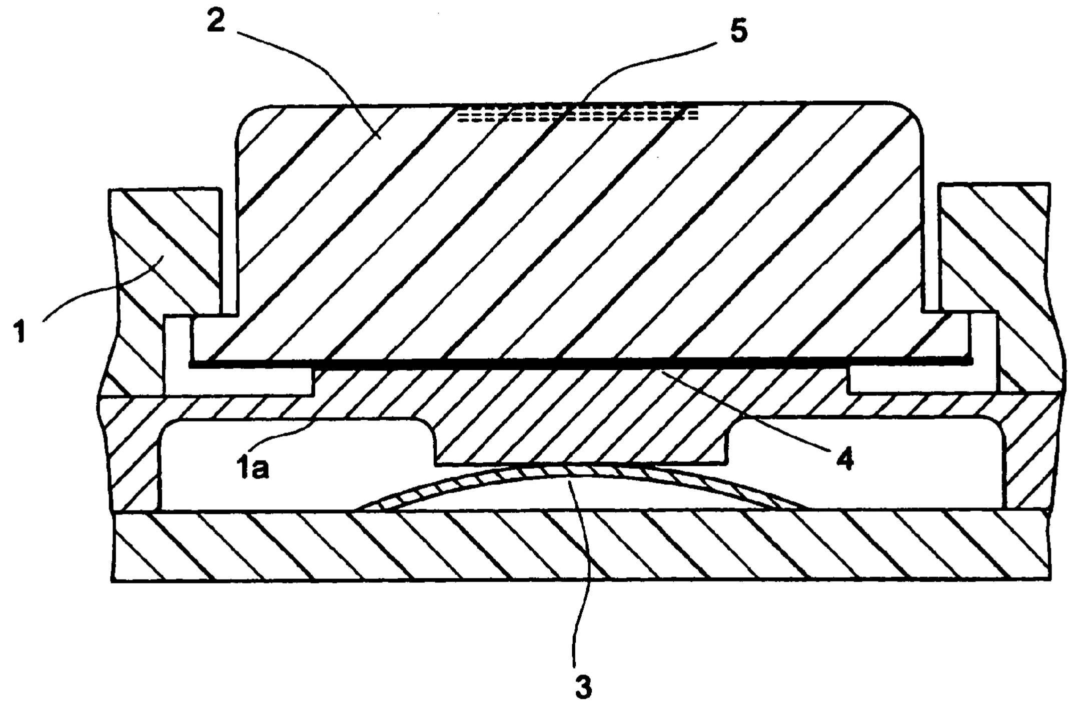
FIG. 6 is an enlarged cross-sectional view showing a state where marking is applied to the top face of a key top shown in FIG. 5 by impregnation printing.

FIG. 5 is a schematic diagram explaining the step of applying marking onto the top face of each key top 2 by impregnation printing. In the heat transfer method as a technique of impregnation printing, a special release paper 16 having characters, symbols, etc. printed preliminarily with a subliming ink on a plastic film is used. (A) shows the state where the release paper 16 is brought above in the vicinity of the assembled key unit K; (B) shows the state where the release paper 16 is bonded to the key tops 2 by thermo compression bonding; (C) shows the state where impregnation printing of characters, symbols, etc. 5 onto the top face of the key top 2 is completed. FIG. 6 is an enlarged cross-sectional view showing the state where marking onto the top face of a key top 2 is applied by impregnation printing. The extent over which the printing ink seeps (where language specific characters, etc. 5 are formed) is indicated by few broken lines drawn at the top of the key top 2, while a printing layer (where basic characters etc. 4 are to be formed) is indicated by the heavy line drawn at the bottom of the key top 2.

Figure 7:
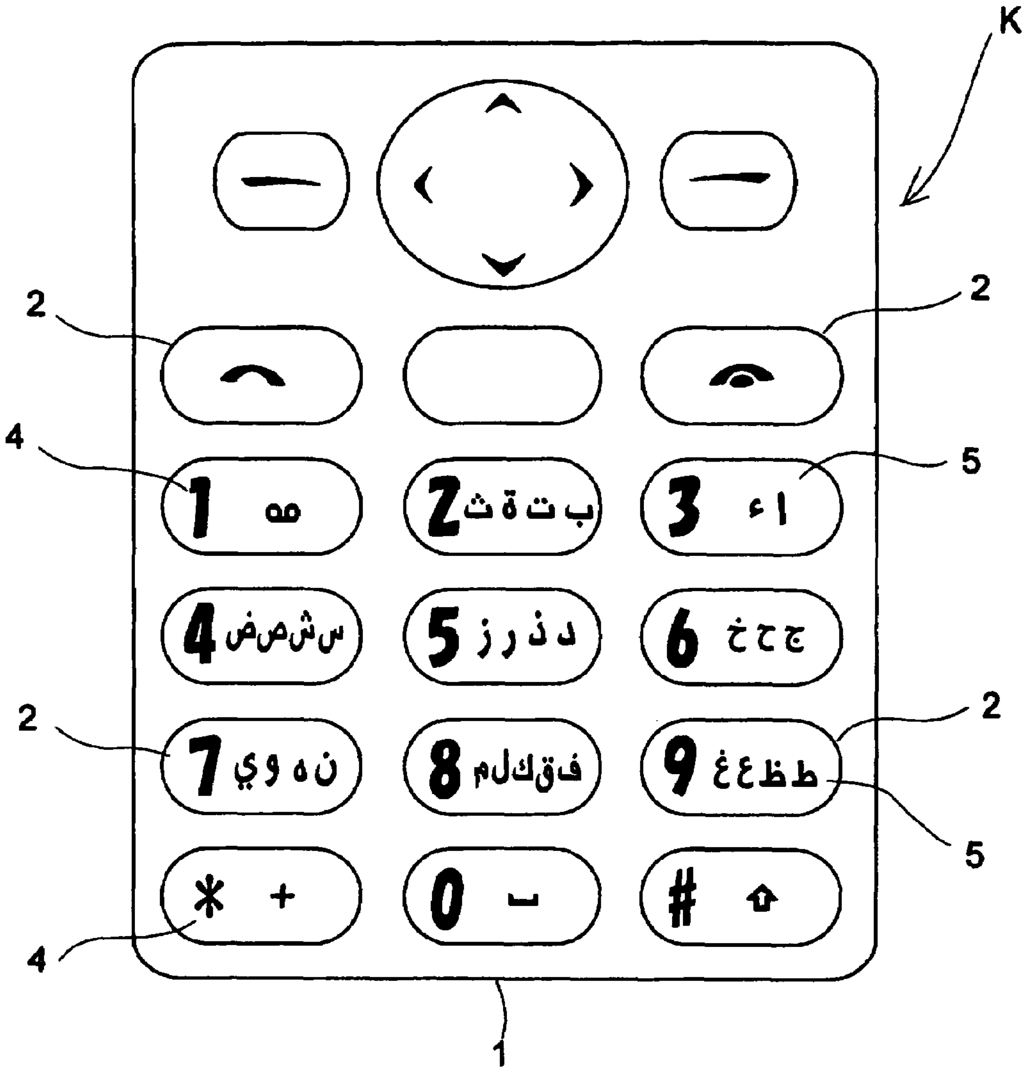
FIG. 7 is a diagram showing an example of characters and symbols of a specific language (Arabic) formed on the top face of each key top in Block S6 "Forming language specific characters" in the process shown in FIG. 3.

FIG. 7 shows an example of characters and symbols 5 of a specific language (Arabic is shown in FIG. 7) formed on the top faces of the respective key tops 2 by application of marking after determination of the destination (the basic characters 4 formed on the bottom faces of the key tops 2 are also seen).

Sixth Embodiment

As an alternative to the fifth embodiment described above, there is shown a case where a polycarbonate (PC) resin is selected as the key top material. The PC resin is widely used for making key tops of key units for mobile devices, and it is as it were a commonly used material. However, the PC resin involves a problem that it has rather insufficient surface hardness, because it is a noncrystalline resin. Therefore, if impregnation printing is directly applied to the surface of the PC resin key top, the impregnating ink can be rubbed off as the resin surface wears.

Thus, in the case of the PC resin, the surface of the key top is covered beforehand with a protecting coating layer having high abrasion resistance, and impregnation printing is applied to this layer. As the material of the protecting coating layer, there may be used, for example, a polyurethane-acrylate series UV-curing resin (UV coating agent). Although it is, of course, conceivable to form a protecting coating layer after impregnation printing, the technique of forming the protecting coating layer preliminarily before determination of the destination, as described above, meets the objects of the present invention.

Seventh Embodiment

Figure 8:
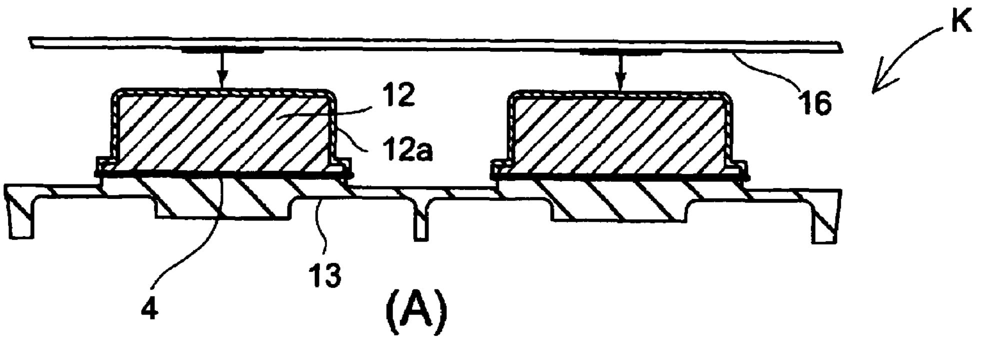
FIG. 8 shows schematic diagrams explaining stepwise the marking step to apply marking onto the top faces of key tops resorting to impregnation printing.
Figure 8:
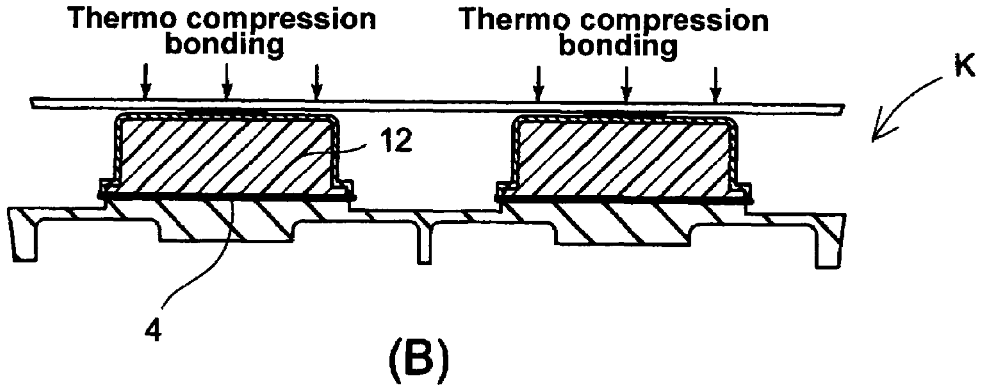
Figure 8:
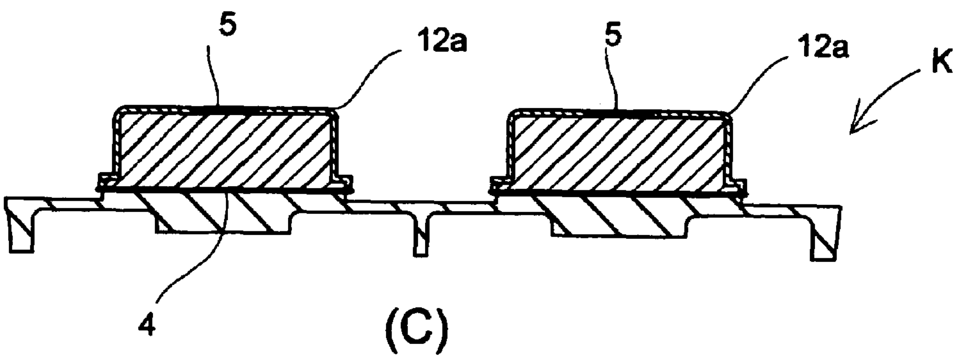
Figure 9:
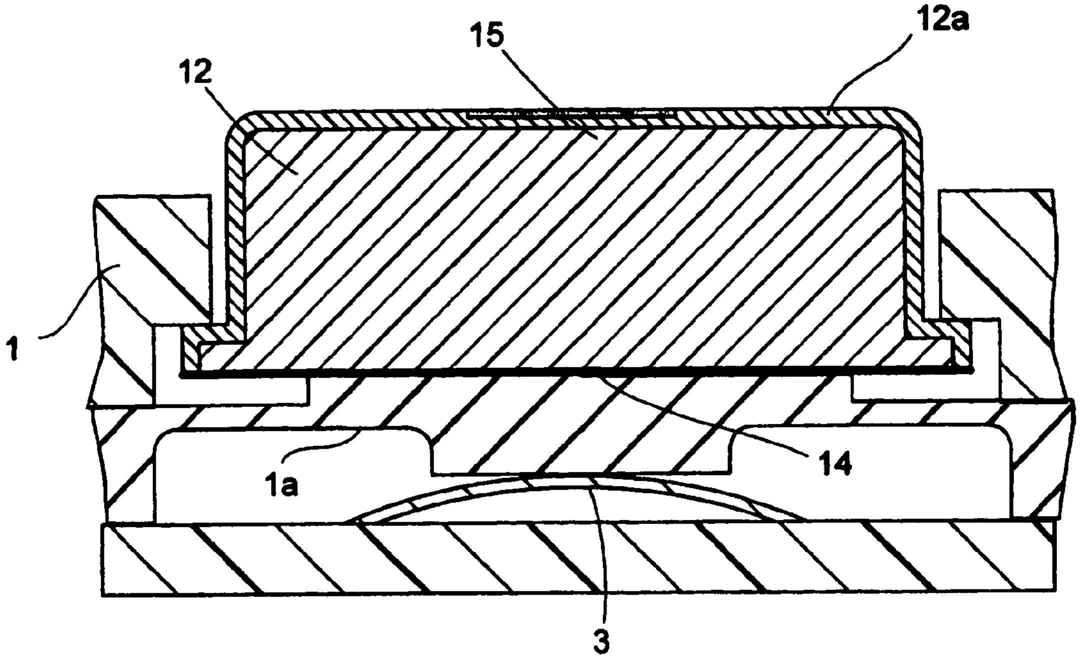
FIG. 9 is an enlarged cross-sectional view showing a state where marking is applied to the top face of a key top by impregnation printing.

An alternative to the fifth and sixth embodiments is shown in FIGS. 8 and 9. In this alternative process for producing a key unit, a polybutylene terephthalate (PBT) resin film or a film of a mixture of a PBT resin and a polycarbonate (PC) resin is used as the key top material and is molded into a three-dimensional key top shape, another transparent resin is charged into the depression formed on the rear side of the molded part to form a key top, and then impregnation printing of characters, symbols, etc. is applied to the resin film of the key top laminated with it.

Although the polybutylene terephthalate (PBT) resin has been noted for its high compatibility to impregnation printing among many other resin materials, molded products of the PBT resin are opaque white, so that the resin is subject to some limitations in that it is not suitable for a design where characters etc. printed on the rear face of the key top is seen through it from the top face. However, the PBT resin has favorable properties as the film for key tops that it shows excellent abrasion resistance, even when molded into a thin film, and excellent moldability and that, when the resin is subjected to drawing to have a three-dimensional shape, the resulting drawing can maintain the three-dimensional shape stably.

Thus, in this embodiment, a PBT resin is formed into a thin film (thickness: 20 to 300 μm), or a PBT resin is diluted with a PS resin and the resulting mixture is formed into a thin film so as to dilute the inherent color (opaque white) of the PBT resin and also to make effective use of the properties of the PBT resin including compatibility to impregnation printing, abrasion resistance and molding stability. It should be noted here that a PC resin or a mixture of a PC resin and polystyrene (PS) resin can be given as the transparent resin for forming the main body of the key top.

In applying impregnation printing onto the key top laminated with the above resin film, there are two possible techniques: one is the heat transfer method and the other is the direct method. In the heat transfer method, a special plastic release paper on which characters, symbols, etc. to be printed are plotted with a special ink kneaded together with a subliming dye is placed on the top faces of key tops and is bonded to them by compression at a predetermined temperature for a predetermined time. Thus, the coating component contained in the ink sublimes and vaporizes to seep into the resin film to a depth of 30 to 50 μm from the surface, anchoring the characters, symbols, etc. in the surface layer of the key top.

Meanwhile, in the direct method, the same special ink as described above is used for printing characters, symbols, etc. directly onto the top face of each key top by means of pad printing or screen printing, followed by heat treatment under predetermined conditions. Thus, the coating component contained in the ink sublimes and vaporizes to seep into the resin, anchoring the characters, symbols, etc. in the surface layer of the key top like in the heat transfer method.

The process in this embodiment is actually the same as shown in the process diagram of FIG. 3. Incidentally, referring to the reference marks in FIG. 8, K represents a key unit; 12, a key top; 12*a*, a resin film layer covering the key top 12; 13, a key pad; 4, a basic character and 5, language specific characters. As described already, FIG. 3 is a block diagram showing the process for producing an illuminated key unit K according to the present invention including marking after assembling. FIG. 4 is a plan view of the key unit K to be formed in the block "Forming basic characters" in FIG. 3.

In this production process, as shown in FIG. 3, the key tops 12 and the key pad 13 are formed by injection molding in separate steps (S1, S2) respectively, and after formation of numerical characters and the like (basic characters) 4 which are not related to the relevant language on the key tops 12 (S3, which can be skipped), the key tops 12 and the key pad 13 are assembled by bonding them together with an adhesive or the like (S4). The ellipsoids or ovals shown in FIG. 4 express key tops 12 each laminated with a resin film, and basic characters 4 including numerical characters and symbols are formed on the bottom faces of the respective key tops 12. These basic characters 4 are formed as the markings which are not related to the relevant language prior to "Determining destination" (S5) in the above block diagram, and in this state the process of producing the key unit K is interrupted or stopped once. In FIG. 2, the basic characters M(4) are seen through the key tops 12.

When the destination is determined and those elements of characters, symbols, etc. which are related to the relevant language are defined, the process of producing the key unit 1 is resumed or started, and then the characters, symbols, etc. that are specific to the language of the destination (language specific characters) 5 are marked onto the top faces of the respective key tops 2 (on the resin film layers 2*a*) by impregnation printing (S6). The entire production process is completed by application of this final marking onto the top faces of the respective key tops 2. The key unit K thus obtained as a finished product is incorporated into a predetermined mobile device and is shipped to the destination.

FIG. 8 is a schematic diagram explaining the step of applying marking onto the top faces of the key tops 12 by means of impregnation printing. In the heat transfer method as a technique of impregnation printing, a special release paper 16 having characters, symbols, etc. printed preliminarily with a subliming ink on a plastic film is used. FIG. 8(A) shows the state where the release paper 16 is brought above in the vicinity of the key tops 12 assembled into the key unit; FIG. 8(B) shows the state where the release paper 16 is bonded to the key tops 12 by thermo compression bonding (e.g., at 150° C. for about 5 minutes); FIG. 8(C) shows the state where impregnation printing is completed. FIG. 9 is an enlarged cross-sectional view showing the state where marking onto the top face of a key top 2 is achieved by impregnation printing. The extent over which the printing ink seeps into the resin film 12*a* (where language specific characters, etc. 5 are formed) is indicated by the line segment drawn at the top of the resin film 12*a*, while a printing layer (where basic characters, etc. 4 are formed) is indicated by the heavy line drawn at the bottom of the key top.

FIG. 7 shows an example of characters and symbols of a specific language (Arabic is shown in FIG. 7) formed on the top faces of the key tops 2 by application of marking after determination of the destination (the basic characters 4 formed on he bottom faces of the key tops 2 are also seen).

Eighth Embodiment

Figure 10:
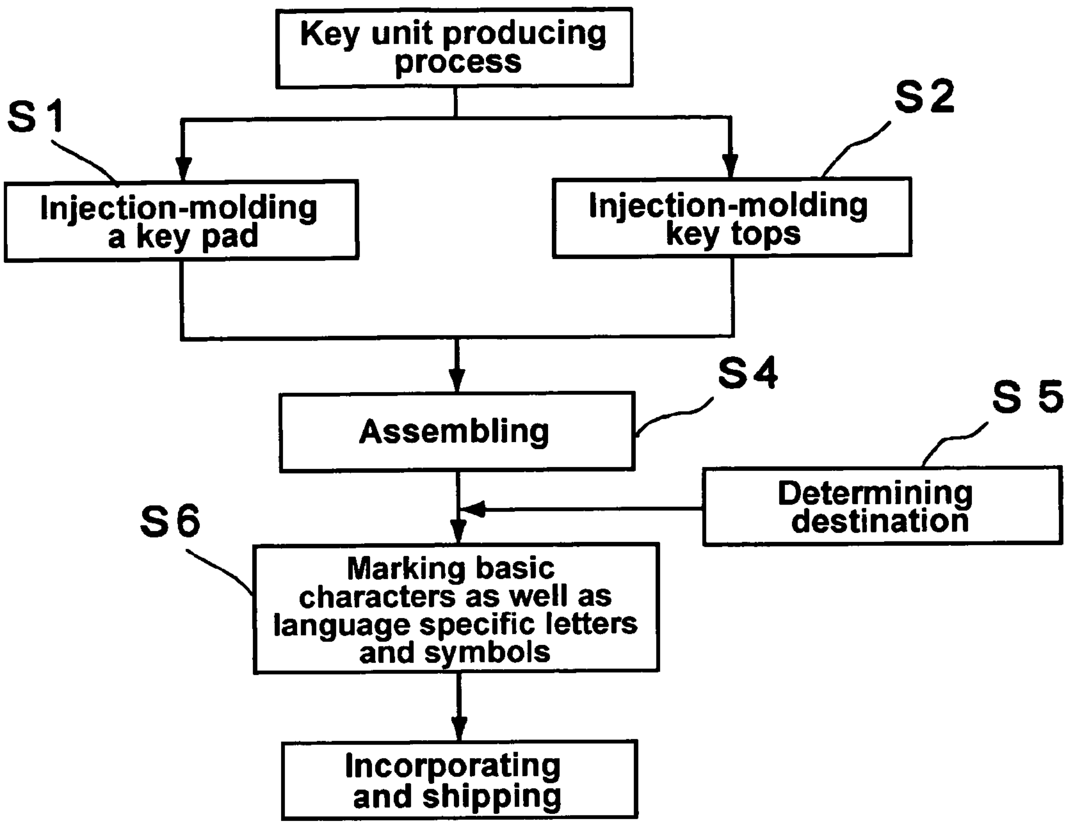
FIG. 10 is a block diagram showing the flow of the production process according to the method of an eighth embodiment.

While a laser is used as the marking method like in the first to fourth embodiments, what is different here is the mechanism of forming characters, symbols, etc. on the key tops with the laser beam. The eighth embodiment will be explained referring to FIGS. 10 and followings. FIG. 10 is a block diagram showing a process for producing an illuminated key unit 21 according to the present invention including marking after assembling. In FIGS. 11 to 14, the reference mark 21 represents a key unit; 22, a key top; 23, a key pad made of a silicone rubber or a thermoplastic elastomer; 24, a basic character; 25, language specific characters; and 26, a laser irradiator.

Figure 11:
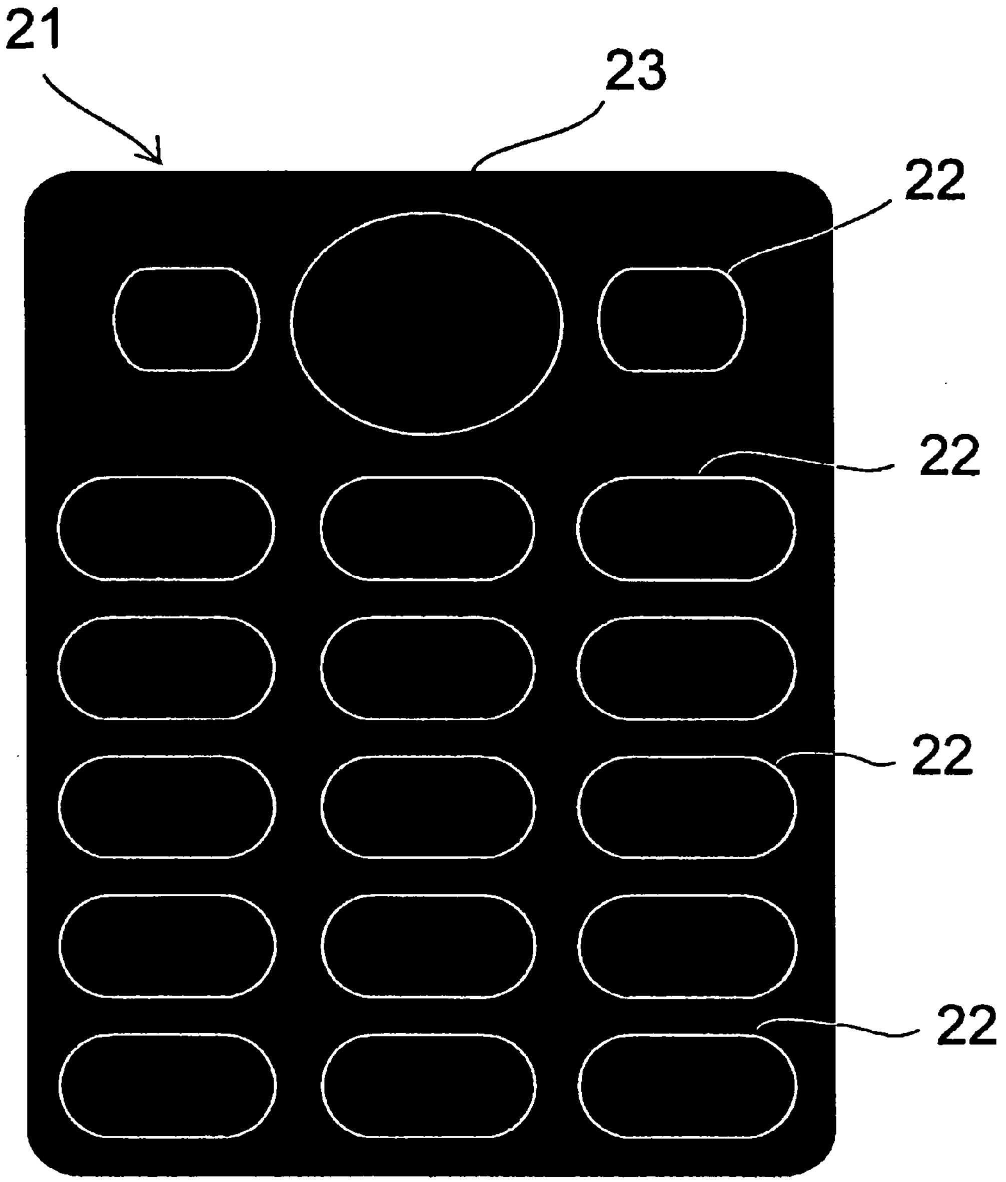
FIG. 11 is a plan view of a key unit to be formed in Block S4 "Assembling" in the production process.

In this embodiment, the key tops 22 shown in FIG. 11 are formed, for example, by subjecting a resin composition containing a polycarbonate (PC) resin and an adequate amount of kechene black added as an absorbent to injection molding (S1), and after a key pad 23 is formed by subjecting a silicone rubber to injection molding (S2), the key tops 22 and the key pad 23 are assembled by bonding them together with an adhesive (S4), as shown in the process diagram of FIG. 10. If necessary, a light blocking film may be formed on the upper face of the key pad 23. Since each key top 22 is a translucent or opaque gray or black molded product, it is not suitable for a constitution where characters, symbols, etc. are plotted on the bottom face of the key top to be seen through it from the upper face. Therefore, the assembling step (S4) is carried out without application of marking of characters etc. onto the bottom face of the key top, and the process of producing the key unit 21 is interrupted once. FIG. 11 is a plan view showing the key unit 21 after completion of the assembling step (S4). The reason why the entire key unit 21 is shown as blackened is that the upper face of the key pad 23 is blocked from light, and that the ellipsoid or oval key tops 22 appear to be gray or black due to kechene black contained in them.

Figure 14:
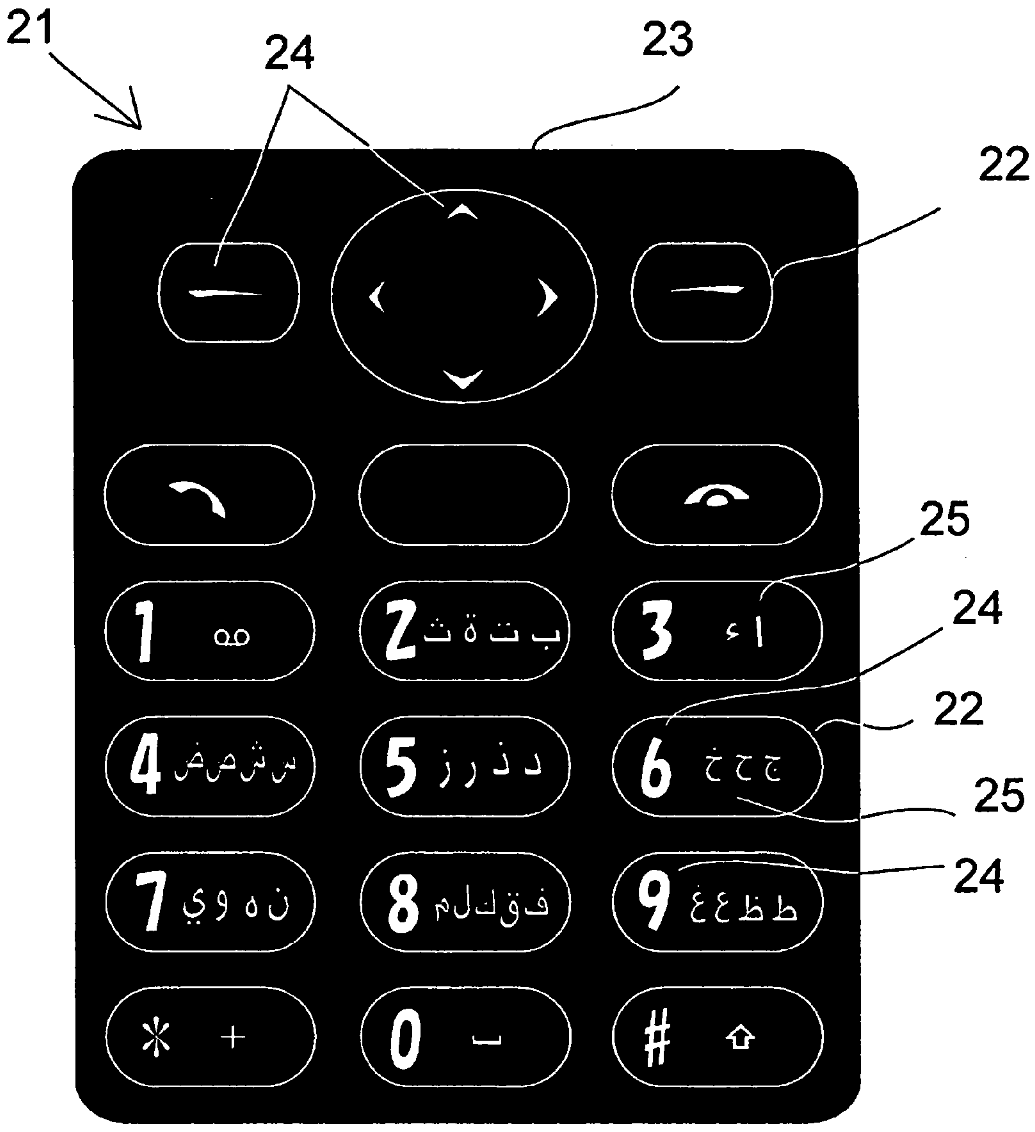
FIG. 14 shows examples of characters and symbols of a specific language (Arabic) and numerical characters and the like which are not related to the relevant language formed on the top faces of the respective key tops.

When the destination is determined and those characters, symbols, etc. which are related to the relevant language are defined, the process of producing the key unit 21 is resumed, and numerical characters and the like (basic characters) 4 which are not related to the relevant language, as well as, characters, symbols, etc. that are specific to the language of the destination (language specific characters) 5 are combined and are marked on the top faces of the respective key tops 22 by irradiation of a laser beam (S6), as shown in FIG. 14. The entire production process is completed by application of this final marking onto the top faces of the key tops 22. The key unit 21 thus obtained as a finished product is incorporated into a predetermined mobile device and is shipped to the destination.

Incidentally, resin materials other than the PC resin suitable for forming key tops in view of heat resistance, abrasion resistance, impact resistance, etc. include POM (polyacetal) resin, ABS (acrylonitrile-butadiene-styrene copolymer) resin, HIPS (high impact polystyrene) resin, PP (polypropylene) resin, PA (polyamide) resin, PBT (polybutylene terephthalate) resin, ABS-PBT alloy (mixed) resin and ABS-PC alloy resin.

It is also possible to add to these resins suitable pigments, additives, etc. other than kechene black described above and to allow the characters, symbols, etc. to be marked to develop color (yellow, green, blue, orange, pink, etc.). In this case the color of characters on the key tops can be changed from key to key depending on the function of the respective keys.

Figure 12:
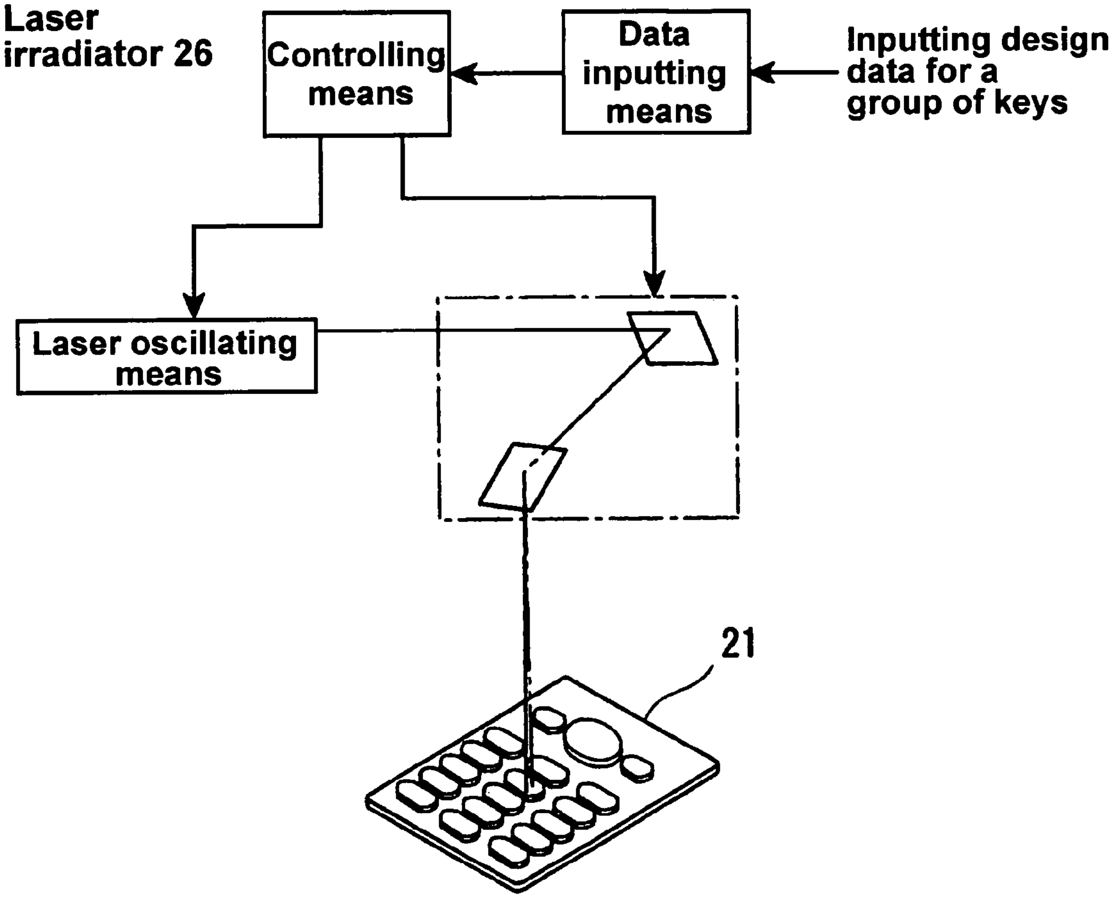
FIG. 12 is a schematic diagram of means, explaining "Marking" S6 in FIG. 10 to irradiate a laser beam onto the top face of each key top.

FIG. 12 is a schematic diagram explaining the step of applying marking onto the top face of the key top 22 by means of laser beam irradiation. Marking patterns M are first designed for the respective keys. Each marking pattern M consists of a combination of a numerical character or the like (basic character) 24 that is not related to the relevant language and language specific characters, symbols, etc. This designing is carried out for all of the keys contained in the key unit of interest. Next, the thus designed marking patterns for the group of keys are input into the laser irradiator 26 and are stored as digital data. The laser irradiator 26 implements, based on the stored digital data, full-automatic application of the predetermined markings onto the top faces of the key tops 2 by correlating and controlling the three-dimensional position (X, Y, Z coordinates) of the laser beam spot and on-off timing of laser beam irradiation.

Laser oscillating means to be employed in the laser irradiator 26 is not particularly limited so long as it can give powers necessary for achieving marking. For example, it is possible to employ a popular $CO_2$ laser or a YAG laser as a typical solid laser. The mode of oscillation is not critical and it may be of continuous or pulsated.

Figure 13:
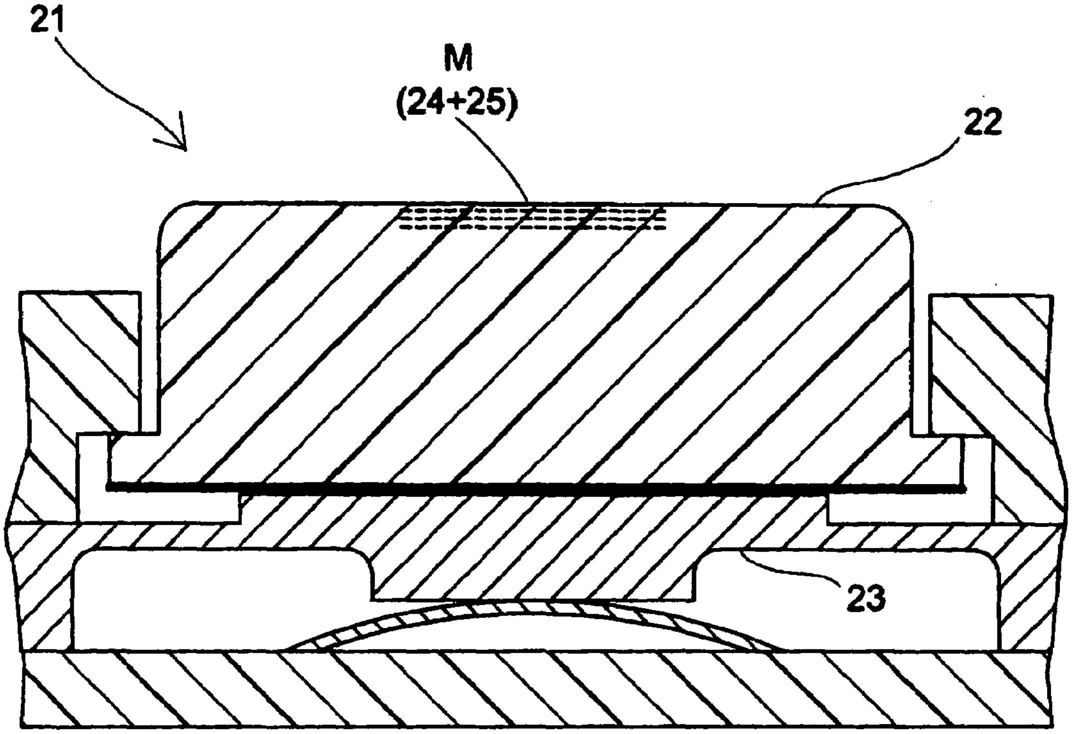
FIG. 13 is an enlarged cross-sectional view showing a state where marking is applied to the top face of a key top by irradiation of a laser beam.

FIG. 13 is an enlarged cross-sectional side view showing the state where a marking is applied to the top face of a key top 22 by irradiation of a laser beam. The broken lines express, for example, a character or a symbol M formed as a three-dimensional assemblage of white spots formed immediately under the top face of the key top 22.

FIG. 14 is a plan view showing the state where application of marking onto the key unit 21 is completed after determination of the destination. In FIG. 14, each key top 21 has on the top face a combination of a basic character 24 and characters and symbols 25 of a specific language (Arabic is shown in FIG. 14).

Ninth Embodiment

A ninth embodiment employing key tops each covered on the surface with a multilayer film which can be printed on by irradiation of a laser beam will be described referring to FIGS. 15 to 17 in order to produce an illuminated key unit, which has fully abrasion-resistant characters, symbols, etc. marked on it and which can be completed as soon as possible after determination of the destination.

In the illuminated key unit according to the ninth embodiment, each key top covered on the surface with a multilayer film, which can be printed on by irradiation of a laser beam, is bonded to a key pad made of a light-transmitting rubber or thermo-plastic elastomer (hereinafter referred to as "light-transmitting key pad"). Then, a laser beam is irradiated upon the top face of the key top to apply marking of predetermine characters, symbols, etc. The thus marked characters, symbols, etc. neither come off nor disappear even by application of friction, realizing excellent abrasion resistance.

As the multilayer film which can be printed on by irradiation of a laser beam, for example, the one as disclosed in the pamphlet of PCT Publication No. 02/30677 (WO0230677) can be used, as mentioned already. In the pamphlet, a film having a multilayer structure is disclosed, and the film contains a transparent plastic film having on the lower face a metal vapor-deposited film, and a colored layer formed with some distance secured from the metal vapor-deposited film.

In the process of producing the key unit, the production is interrupted or stopped once to form a semi-finished product in the state where all of the steps including assembling which are implementable without determination of the destination are finished. More specifically, the key tops each covered on the surface with the multilayer film are bonded to the light-transmitting key pad to complete assembling of the key unit. For the semi-finished product, what is remaining in this state is only the step of applying marking onto the top face of each key top. Final marking of characters including the characters, symbols, etc. which are related to the destination is carried out, as soon as they are defined, by irradiating a laser beam onto the top surface of the key top, and thus each key unit can be completed in the shortest period of time after determination of the destination.

The process diagram showing the process of producing the illuminated key unit is the same as that of the eighth embodiment shown in FIG. 10. FIG. 17 is a schematic diagram showing the constitution of the multilayer film 2a. In FIG. 17, the reference marks 37, 38 and 39 represent the plastic film, the metal vapor-deposited film and the colored layer in the multilayer film 2a, respectively.

The multilayer film 2a which can be printed on by irradiation of a laser beam will be described referring to FIG. 17. A 50 μm-thick polyethylene terephthalate (PET) film was used as the plastic film 37, and a 100 nm-thick aluminum vapor-deposited film 38 was formed on the lower side of the film 37 through a 10 μm-thick protecting and coloring layer 40 (for coloring the armor). Further, a 10 μm-thick transparent or colored transparent protecting and coloring layer 41, a 200 μm-thick adhesive layer 42, a 10 μm-thick colored layer 39 (for giving characters) and a 50 μm-thick PET resin film 37a were built up successively on the lower side of the vapor-deposited film 38.

A key top 2 was formed by subjecting the multilayer film 2a to stamping to form an outer shape of the key top 2 as shown in FIG. 4, and then a transparent hard resin 10 such as a polycarbonate (PC) resin and a PET resin was charged into the depression formed on the rear side of the outer shape.

The process diagram of this embodiment is the same as that shown in FIG. 10. Key tops 2 and a key pad 1 are formed in separate steps (Steps S1, S2) respectively, and they are assembled by bonding them together with an adhesive and the like (Step S4). If necessary, a light-blocking film may be formed on the top face of the key pad 1. The surface of each key top 2 is covered with the opaque multilayer film 2a except for the portions printed by irradiation of a laser beam onto the top face, so that the key top 2 is not suitable for the constitution where characters, symbols, etc. are plotted on the bottom face of the key top to be seen through it from the upper face. Therefore, the assembling step (S4) is carried out without application of marking of characters and the like on the bottom face of the key top 2, and in this state the process of producing the key unit K is interrupted once to provide a semi-finished product.

If the same marking means is employed, plural kinds of key tops if present can be treated by it by controlling the movement with the marking means (by controlling delicately the movement of the marking means within the same step). For example, in the case where blasting is employed as the marking means, it is possible to treat both resin key tops and glass key tops, even if they are commingled. In the case where laser machining is used as the marking means, it is possible to treat film key tops, keys to be marked by blackening or whitening and keys to be marked by multi color development, even if they are commingled.

Figure 15:
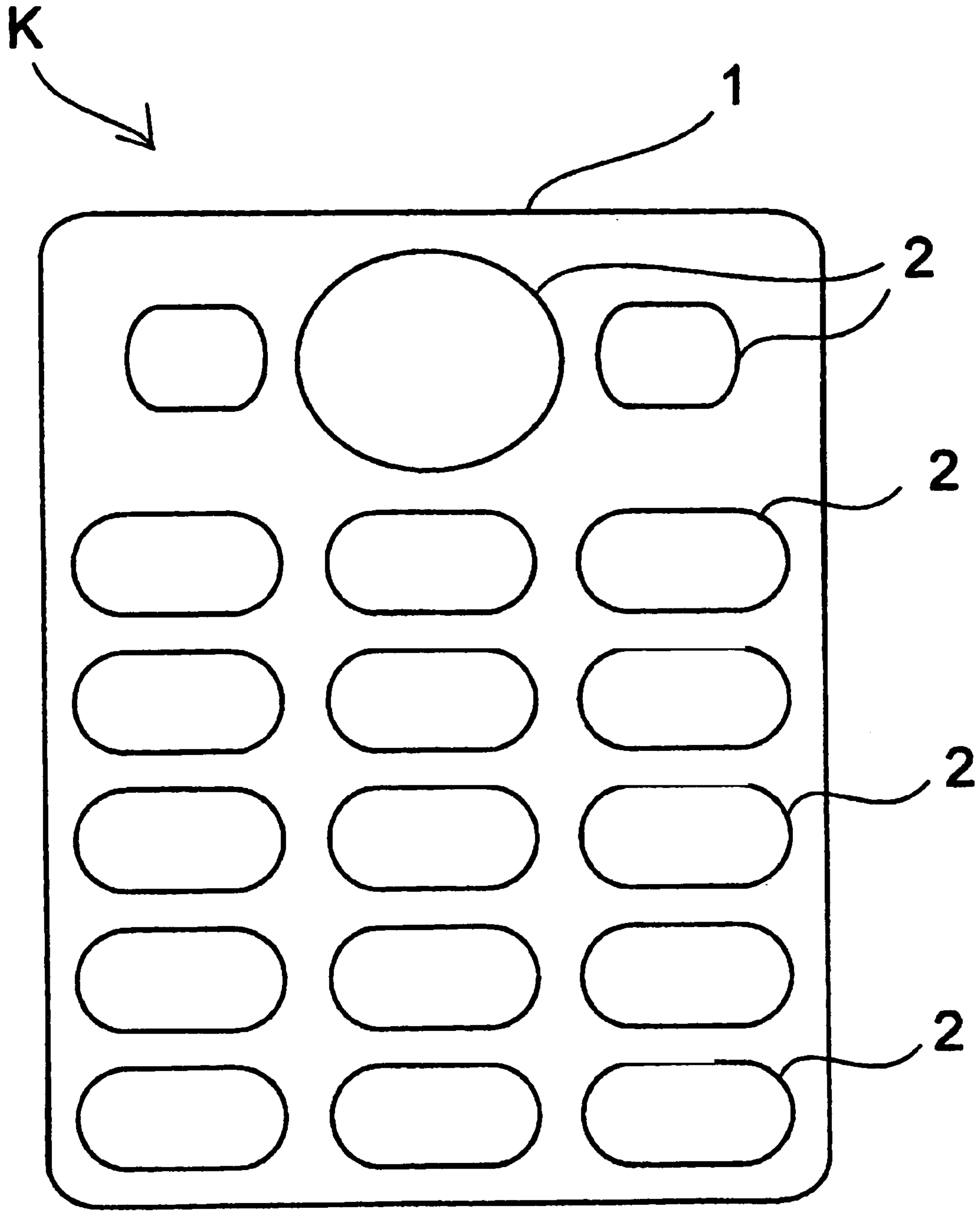
FIG. 15 is a plan view of a key unit to be formed in Block S4 "Assembling" (see FIG. 10) in the production process according to a ninth embodiment.

FIG. 15 is a plan view of the key unit 1 showing the state where the assembling step (S4) is completed. The ellipsoids or ovals shown in FIG. 15 express unmarked key tops.

When the destination is determined and those characters, symbols, etc. which are related to the relevant language are defined, the process of producing the key unit K is resumed, and numerical characters and the like-(basic characters) 4 which are not related to the relevant language, as well as, the characters, symbols, etc. that are specific to the language of the destination (language specific characters) 5 are combined and are marked on the top faces of the key tops 22 by irradiation of a laser beam (S6), as shown in FIG. 7. The entire production process is completed by application of this final marking onto the top faces of the key tops 2. The key unit K thus obtained as a finished product is incorporated into a predetermined mobile device and is shipped to the destination.

The process diagram of applying making onto the top face of the key top 2 by irradiation of a laser beam is the same as that shown in FIG. 12. First, marking patterns to be marked on the top faces of the key tops 2 are first designed respectively. Each marking pattern consists of a combination of a numerical character or the like (basic character) 4 that is not related to the relevant language and language specific characters, symbols, etc. This designing may be carried out at a time for all of the keys contained in the key unit of interest. Next, the thus designed marking patterns for the group of keys are input into the laser irradiator 26, shown in FIG. 12, and are stored as digital data. The laser irradiator 26 implements, based on the stored digital data, full-automatic application of the predetermined markings onto the top faces of the respective key tops 22 by correlating and controlling the three-dimensional position (X, Y, Z coordinates) of the laser beam spot and on-off timing of laser beam irradiation.

Laser oscillating means to be employed in the laser irradiator 26 is not particularly limited so long as it can give powers necessary for achieving marking. For example, it is possible to employ the popular $CO_2$ laser or a YAG laser as a typical solid laser. The mode of oscillation is not critical and it may be of continuous or pulsated.

Figure 16:
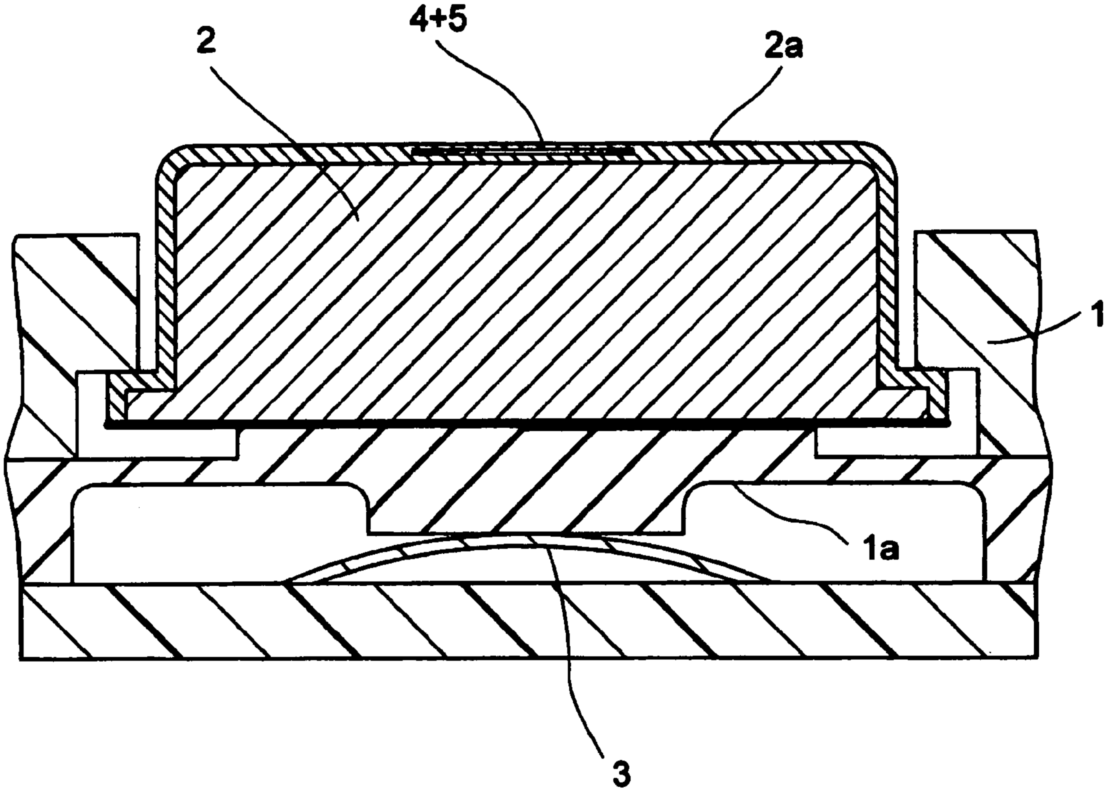
FIG. 16 is an enlarged cross-sectional view showing a state where application of marking is achieved by irradiating a laser beam onto the top face of a key top covered with a multilayer film which can be printed on by laser beam irradiation.
Figure 17:
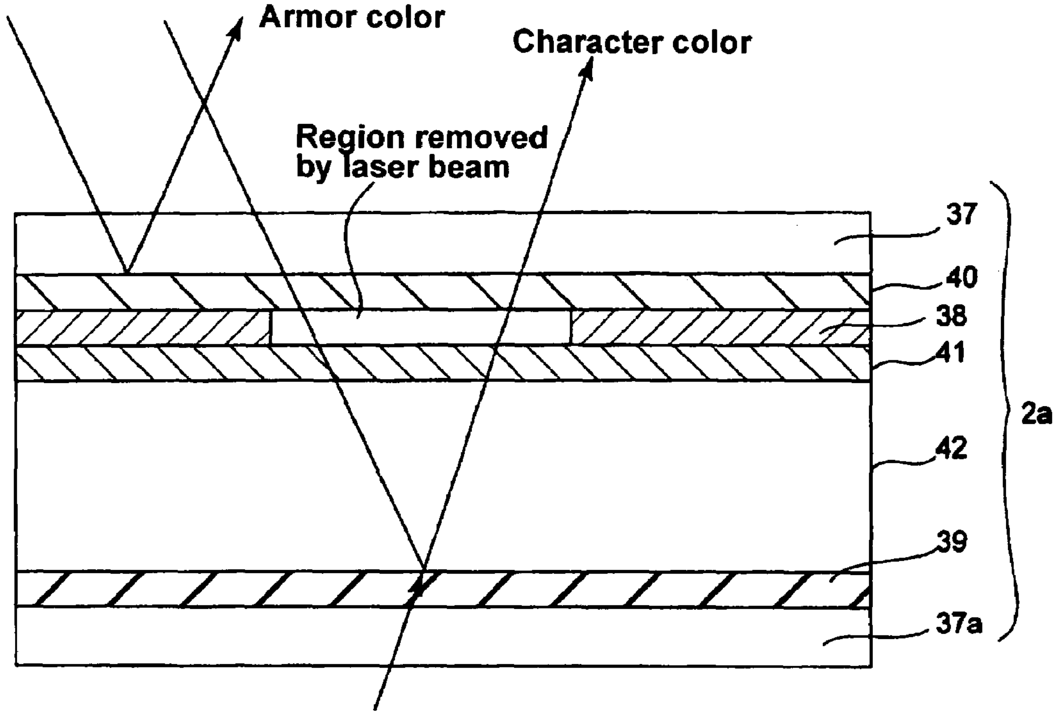
FIG. 17 is a schematic diagram showing the constitution of the multilayer film which can be printed on by irradiation of a laser beam.

FIG. 16 is an enlarged cross-sectional side view showing the state where marking is applied to the top face of a key top 2 by irradiation of a laser beam. The double line drawn in the multilayer film 2a covering the key top 2 expresses the position of the marking containing a combination (4+5) of a basic character 4 and characters and symbols 5 of a specific language.

The key unit K having gone through the marking after determination of the destination is of the same state as shown in FIG. 7, illustrating combinations of basic characters 4 and language specific characters 5 (Arabic is illustrated in FIG. 7) formed on the top faces of the key tops 2, respectively.

Tenth Embodiment

While a tenth embodiment is illustrated in FIGS. 18 to 21, the key unit of this embodiment is of an illuminated type, in which glass key tops are bonded onto a key pad made of a light-transmitting silicone rubber or thermoplastic elastomer. This embodiment shows as the marking method a blasting technique to blast fine abrasive particles at a high speed against the top face of each glass key top. Incidentally, in attaining the objects, the blasting technique, may be of the masked method using a mask or of the maskless method using no mask.

Glass is excellent in transparency, surface hardness and abrasion resistance. According to the blasting technique, engraving and the like can be applied to the glass surface as desired. If marking is applied by blasting onto the surface of a glass key top, characters, symbols, etc. are indicated each as a pattern formed by an assemblage of fine protrusions and indentations (grains), which induce irregular light reflection to give a fancy appearance. Since such grainy patterns are engraved on the surfaces of the glass key tops respectively, they neither come off nor disappear, exhibiting excellent abrasion resistance.

In the process of producing the key unit of interest, the production is interrupted or stopped once in the state where all of the steps including assembling which are implementable without determination of the destination are finished. More specifically, marking of numerical characters and the like which are not related to the relevant language is finished and the glass key tops and the light-transmitting key pad are bonded together to complete assembling of the key unit. What is remaining in this state is only the step of applying marking onto the top face of each key top. Then, as soon as the elements of characters and symbols related to the destination are defined, the final marking is applied by means of blasting.

However, if the masked blasting technique is employed here, in which portions on the surface of the target glass key top to be left unmarked (where no characters, symbols, etc. are to be marked) are protected with masks, it takes time for forming the masks, and the object of the present invention cannot be fully attained. Therefore, it is desirable to employ the maskless blasting technique using no mask. This realizes the production process that can complete the key units in the shortest period of time after determination of the destination and also attains the objects.

Figure 18:
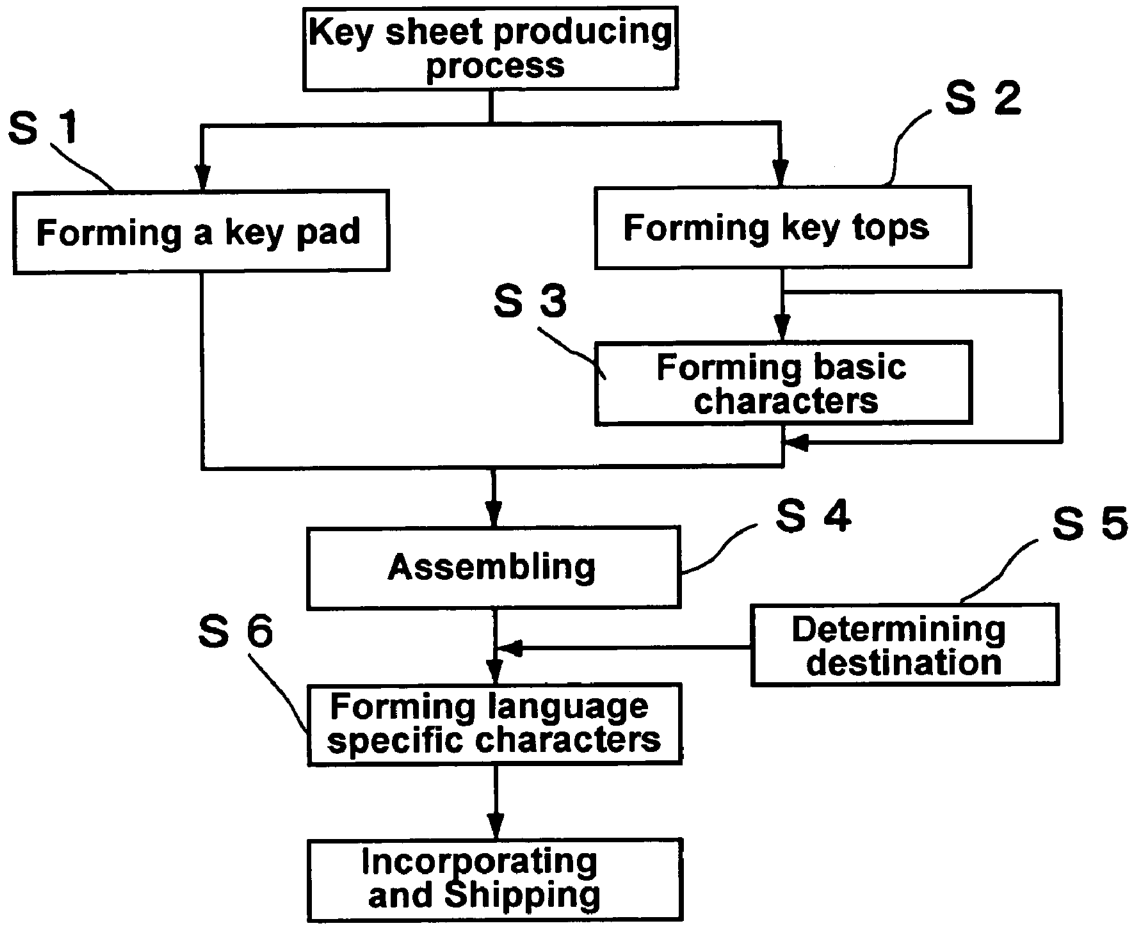
FIG. 18 is a block diagram showing the flow of the production process according to the technique of a tenth embodiment.
Figure 19:
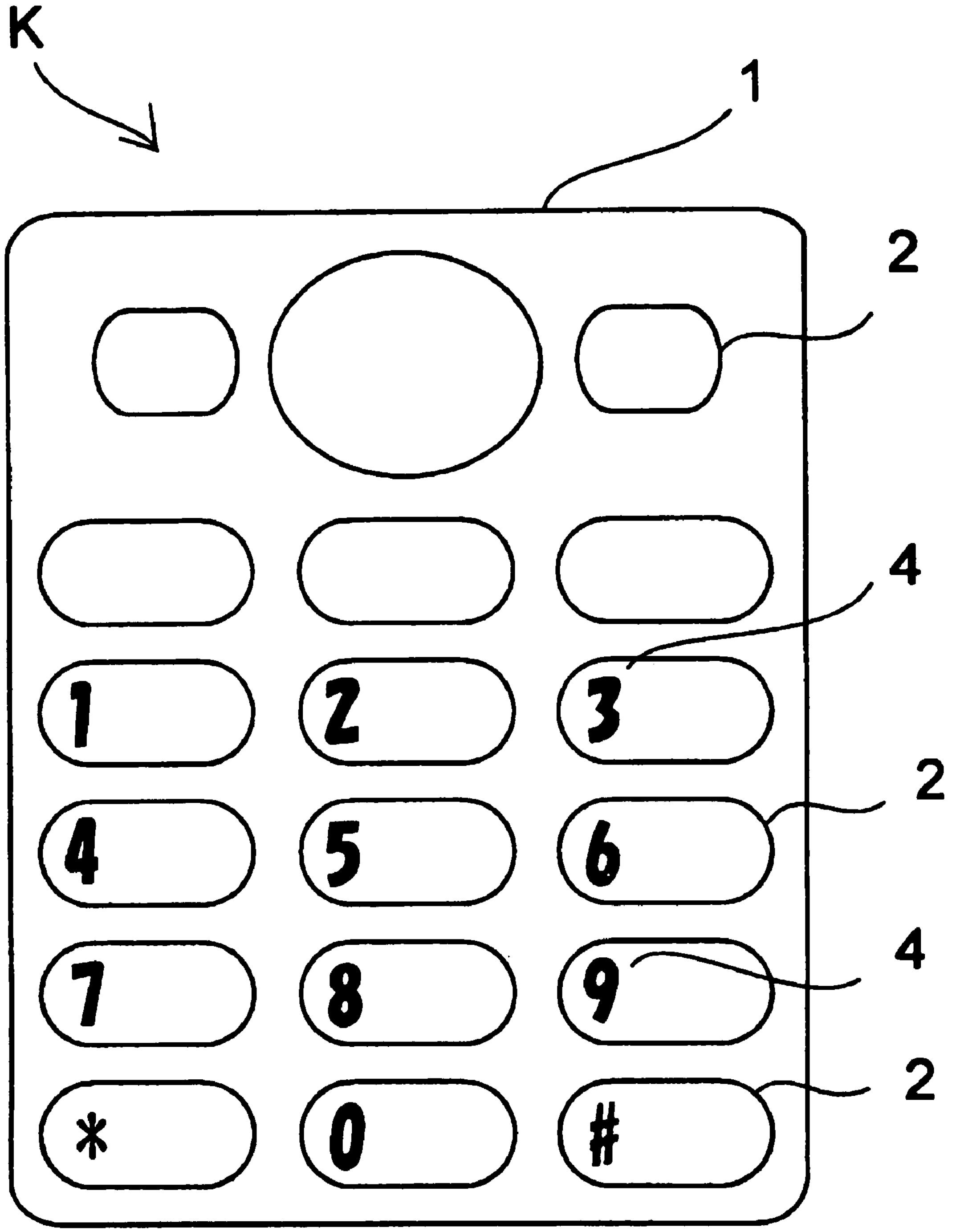
FIG. 19 is a plan view of a key unit to be formed in Block S3 "Assembling" in the production process shown in FIG. 18.
Figure 20:
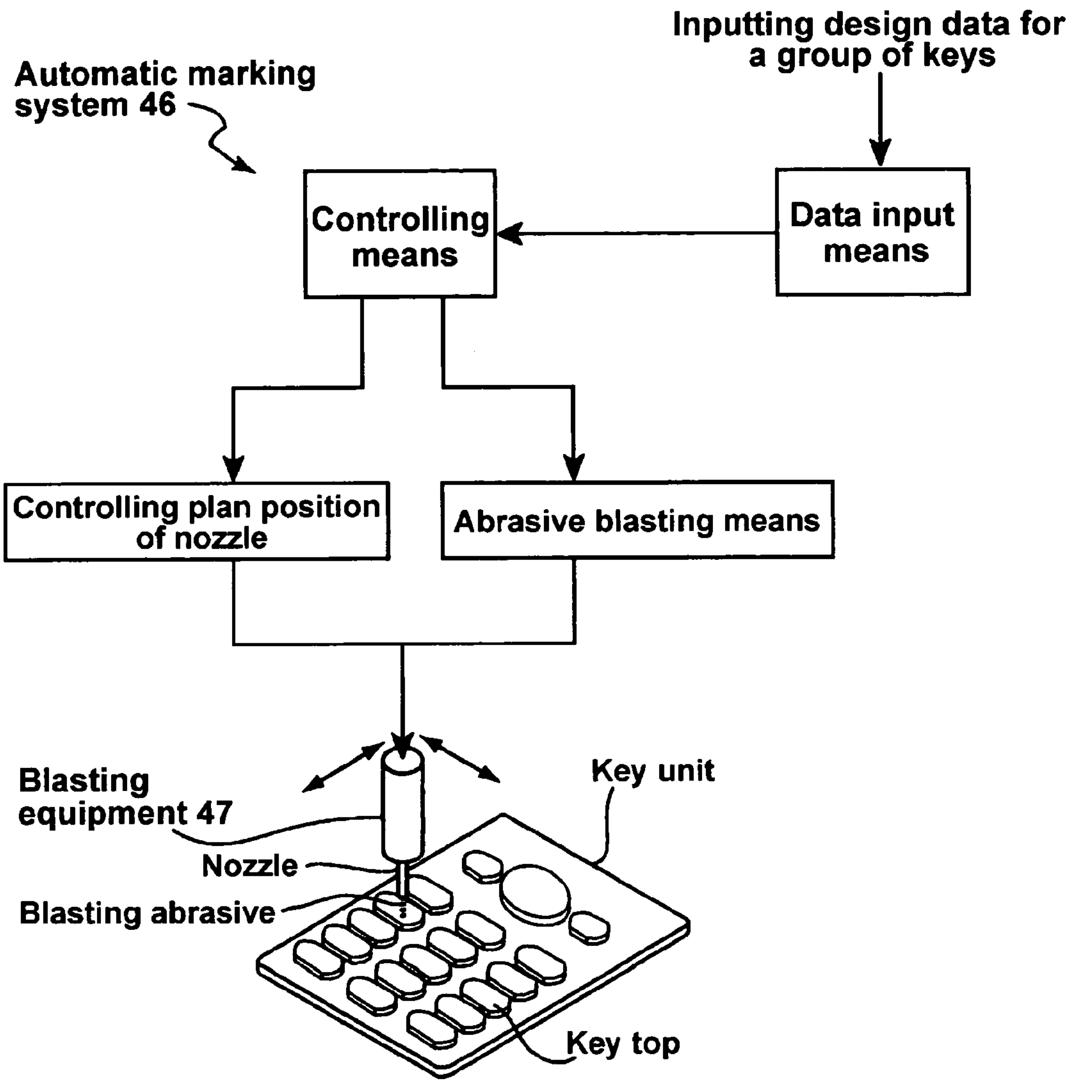
FIG. 20 is a schematic diagram explaining a step of applying marking onto the top face of a glass key top by the blasting technique.

FIG. 18 is a block diagram showing the flow of the process of producing the illuminated key unit according to the present invention. FIG. 19 is a plan view of the key unit 1 to be formed in the block "Forming basic characters" in FIG. 18. In FIGS. 19 and 20, the reference mark 1 represents a key unit; 2, a glass key top; 3, a light-transmitting key pad; 4, a basic character; 5, language specific characters; 46, an automatic marking system; and 47, a blasting equipment.

In the process shown in FIG. 18, the glass key tops 2 and the light-transmitting key pad 1 shown in FIG. 19 are formed in separate steps (S1, S2) respectively, and after formation of numerical characters and the like (basic characters) 4 which are not related to the relevant language, for example, on the bottom face of each glass key top 2 by means of printing, engraving, blasting, etc. (S3), the glass key tops 2 and the light-transmitting key pad 1 are assembled by bonding them together with an adhesive and the like (S4). The ellipsoids or ovals shown in FIG. 19 express the glass key tops 2 of the respective keys, and basic characters 4 including numerical characters and symbols are formed on the bottom faces of the respective key tops 2. These basic characters 4 are formed as the markings which are not related to the relevant language prior to "Determining destination" (S5) in the above block diagram, and in this state the process of producing the key unit K is interrupted once.

In FIG. 19, the basic characters 4 are seen through the respective glass key tops 2. It should be noted here that both the basic characters 4 and the language specific characters 5 can be marked altogether on the top faces of the respective glass key tops 2 after determination of the destination. In this case, the step 3 is skipped, and the process proceeds to the assembling step S4 with the glass key tops 2 remaining unmarked.

When the destination is determined and those elements of characters, symbols, etc. which are related to the relevant language are defined, the process of producing the key unit K is resumed, and the characters, symbols, etc. that are specific to the language of the destination (language specific characters) 5 are marked on the top faces of the key tops 2 by means of blasting (S6). The entire production process is completed by application of this final marking onto the top face of each glass key top 2. The key unit K thus obtained as a finished product is incorporated into a predetermined mobile device and is shipped to the destination.

FIG. 20 is a schematic diagram explaining the step of applying marking onto the top face of each glass key top 2 by means of maskless blasting. First, language specific characters, symbols, etc. 5 to be marked on the top faces of the glass key tops 2 are designed using a CAD machine and the like. This designing is carried out at a time for all of the keys contained in the key unit of interest. Next, the thus designed marking patterns for the respective glass key tops 2 are input into the automatic marking system 46 and are stored as digital data. The automatic marking system 46 implements, based on the stored digital data, full-automatic application of the predetermined markings onto the top faces of the respective glass key tops 2 by correlating and controlling the plan position of a nozzle (X, Y coordinates of the nozzle tip) of the blasting equipment 47 and on-off timing of blasting an abrasive.

Referring to the blasting equipment 47, for example, "the powder injecting apparatus" disclosed in Unexamined Japanese Patent Publication (Kokai) No. 2000-94332 can be applied. Further, the glass key top 2 is formed by subjecting, for example, a low-melting glass having a softening point of about 500° C. to molding, and by blasting, for example, spherical steel beads against it as the abrasive.

The same arrangement as shown in FIG. 7 applies to the characters and symbols 5 of a specific language (Arabic in FIG. 7) formed on the top faces of the respective glass key tops 2 (basic characters 4 can also bee seen).

Eleventh Embodiment

In an eleventh embodiment, a hard resin is selected as the material of the key unit. More specifically, there is disclosed an illuminated key unit having a key pad made of a light-transmitting soft rubber or thermoplastic elastomer (hereinafter referred to as "light-transmitting key pad") and hard resin key tops. There is selected the blasting technique as the marking method, in which fine abrasive particles are blasted at a high speed against the top faces of the hard resin key tops. Incidentally, in attaining the objects, the blasting technique may be of the masked method using a mask or of the maskless method using no mask.

(Common Element)

As the hard resin material for forming the key tops, suitably used are those capable of giving molded articles showing transparency and high surface hardness. Such materials non-limitatively include, for example, polyethylene terephthalate (PET) resins, polyarylate (PAR) resins, polyacrylate (PMMA, PAA) resins, polypropylene (PP) resins, high impact polystyrene (HIPS) resins and styrene-acrylonitrile (SAN) copolymer resins. Meanwhile, according to the blasting technique, engraving and the like can be applied as desired onto the surfaces of hard resin molded articles. If marking is applied to the surface of a hard resin key top by the blasting technique, characters, symbols, etc. can be indicated each as a pattern formed by an assemblage of fine protrusions and indentations (grains), which induce irregular light reflection to give a fancy appearance. Since such grainy patterns are engraved on the surfaces of the hard resin key tops respectively, they neither come off nor disappear, exhibiting excellent abrasion resistance.

With a view to attaining the objects of the present invention, in the process of producing the key unit of interest, the production is interrupted or stopped once in the state where all of the steps including assembling which are implementable without determination of the destination are finished. More specifically, marking of numerical characters and the like which are not related to the relevant language is finished and the hard resin key top and the light-transmitting key pad are bonded together to complete assembling of the key unit. What is remaining in this state is only the step of applying marking onto the top face of each key top. Then, as soon as those elements of characters and symbols which are related to the destination are defined, the final marking is applied by means of blasting.

However, if the masked blasting technique is employed here, in which portions on the surface of the target hard resin key top to be left unmarked (where no characters, symbols, etc. are to be marked) are protected with masks, it takes time for forming the masks, and the objects of the present invention cannot be fully attained. Therefore, it is desirable to employ the maskless blasting technique using no mask. This realizes the production process that can complete the key units in the shortest period of time after determination of the destination and also attains the objects of the present invention.

The block diagram showing the flow of the process of producing the illuminated key unit according to this embodiment is the same as that shown in FIG. 18. Further, the plan view of the key unit K to be produced in the block "Forming basic characters" in FIG. 18 is as shown in FIG. 19. The reference mark K represents a key unit; 2, a hard resin key top; 1, a light-transmitting key pad; 4, a basic character; 5, language related characters; 46, an automatic marking system; and 47, a blasting equipment.

In FIG. 18, the hard resin key tops 2 and the light-transmitting key pad 1 are formed in separate steps (S1, S2) respectively, and after printing of numerical characters and the like (basic characters) 4 which are not related to the relevant language, for example, on the bottom faces of the respective hard resin key tops 2 (S3), the hard resin key tops 2 and the light-transmitting key pad 1 are assembled by bonding them together with an adhesive and the like (S4). The ellipsoids or ovals shown in FIG. 19 express the hard resin key tops 2 of the respective keys, and basic characters 4 including numerical characters and symbols are formed on the bottom faces of the respective key tops 2.

These basic characters 4 are formed as the markings which are not related to the relevant language prior to "Determining destination" (S5) in the above block diagram, and in this state the process of producing the key unit 1 is interrupted once. In FIG. 19, the basic characters 4 are seen through the respective key tops 2. It should be noted here that both the basic characters 4 and the language specific characters 5 can be marked altogether on the top faces of the respective hard resin key tops 2 after determination of the destination. In this case, the step 3 is skipped, and the process proceeds to the assembling step S4 with the hard resin key tops 2 remaining unmarked.

When the destination is determined and those elements of characters, symbols, etc. which are related to the relevant language are defined, the process of producing the key unit K is resumed, and the characters, symbols, etc. that are specific to the language of the destination (language specific characters) 5 are marked on the top faces of the respective key tops 2 by means of blasting (S6). The entire production process is completed by application of this final marking onto the top face of each hard resin key top 2. The key unit 1 thus obtained as a finished product is incorporated into a predetermined mobile device and is shipped to the destination.

FIG. 20 is a schematic diagram explaining the step of applying marking onto the top face of each hard resin key top 2 by means of maskless blasting. First, language specific characters 5 to be marked on the top faces of the hard resin key tops 2 are designed using a CAD machine respectively. This designing is carried out at a time for all of the keys contained in the key unit of interest. Next, the thus designed marking patterns for the respective hard resin key tops 2 are input into the automatic marking system 46 and are stored as digital data. The automatic marking system 46 implements, based on the stored digital data, full-automatic application of the predetermined markings onto the top faces of the respective hard resin key tops 2 by correlating and controlling the plan position of a nozzle (X, Y coordinates of the nozzle tip) of the blasting equipment 47 and on-off timing of blasting an abrasive.

Referring to the blasting equipment 47, for example, "the powder injecting apparatus" disclosed in Unexamined Japanese Patent Publication (Kokai) No. 2000-94332 can be applied. Further, the hard resin key top 2 is formed by subjecting, for example, a polyethylene terephthalate (PET) resin to injection molding, and by blasting, for example, spherical steel beads against it as the abrasive.

Figure 21:
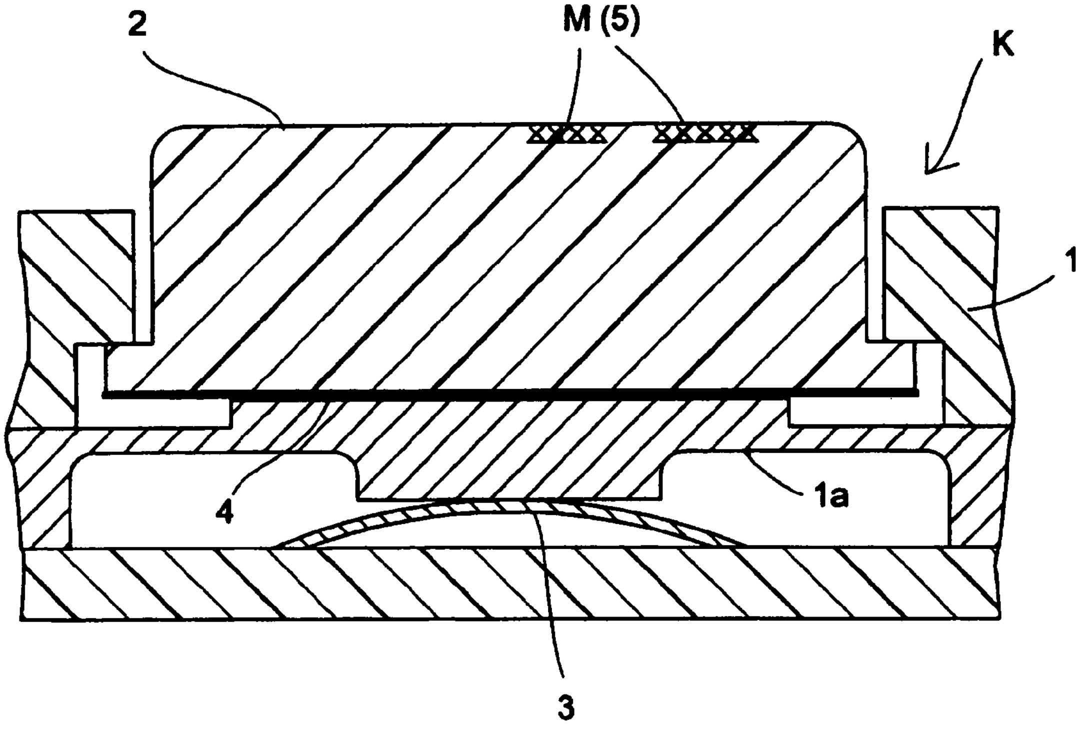
FIG. 21 is an enlarged cross-sectional view showing the state where marking is applied to the top face of a glass key top by the blasting technique.

FIG. 21 is an enlarged cross-sectional view of a hard resin key top 2 having a marking M applied to the top face by means of blasting. The marks "xxx" show the character, symbols, etc. engraved on the top face of the hard resin key top 2.

The same arrangement as shown in FIG. 7 applies to the characters and symbols 5 of a specific language (Arabic in FIG. 7) formed by means of blasting on the top faces of the respective hard resin key tops 2 (basic characters 4 are also seen together with the language specific characters 5).

INDUSTRIAL APPLICABILITY

According to the marking methods of the invention in the first to fourth embodiments, when laser marking of characters, symbols, etc. is applied to the internal medium of plastic keys to be employed in portable telephones and the like, the beam spot diameter is narrowed to increase the density of light energy at the irradiation spot, so that marking can be carried out speedily with the unirradiated portions being maintained at a temperature not higher than the permissible level.

In the plastic keys according to the present invention, since the characters, symbols and the like are blocked from external contact or friction, they can give perfect abrasion resistance. Besides, since these characters, symbols and the like are seen through lens effect as if they are suspended in a transparent plastic medium, the plastic keys can give a novel visual effect.

Further, according to the present invention, since marking of necessary characters, symbols, etc. can be applied afterward by a single step into the inside of transparent plastic keys finished unmarked, a novel process for producing key units as set forth in claim 6 can be established utilizing this technique. According to this novel production process, the lead time from determination of the destination to shipping of products can be reduced in a wide margin to improve user service.

According to the invention of the fifth embodiment (see FIGS. 3 to 7), all of the steps which are implementable without determination of the destination are finished beforehand. As soon as those elements of characters and symbols which are related to the destination are defined, marking of these characters, symbols, etc. related to the destination are applied to the top faces of key tops by means of impregnation printing to complete the entire process. Therefore, the key unit can be completed in a shortest period of time after determination of the destination, dispensing with glut to be caused by wasteful stock production.

Impregnation printing can be carried out using a PET resin or a POM resin as a glass clear all-purpose resin in place of the PBT resin whose inherent color is opaque white. Further, since neither the PET resin nor the POM resin has problems in terms of abrasion resistance, these resins dispense with the protecting layer such as a UV coating on the key top surface.

According to the sixth embodiment (see FIGS. 3 to 7), the present invention can be carried out effectively by combining a PC resin with other materials to make up for rather insufficient abrasion resistance of the PC resin and by applying impregnation printing to the thus combined PC resin.

According to the invention of the seventh embodiment (see FIGS. 8 and 9), all of the steps which are implementable without determination of the destination are finished beforehand. As soon as those elements of characters and symbols related to the destination are defined, marking of the characters, symbols, etc. related to the destination is applied to the top faces of key tops by means of impregnation printing to complete the entire process. Therefore, the key unit can be completed in a shortest period of time after determination of the destination.

The invention as set forth in claim 1 can be carried out effectively by forming a PBT resin into a thin film or by diluting a PBT resin with a PS resin and then forming the resulting mixture into a thin film to dilute the inherent color (opaque white) of the PBT resin and also to make effective use of compatibility to impregnation printing, abrasion resistance, etc. of the PBT resin. In this case, the PBT resin film or the film of a mixture of PBT resin and PC resin has no problem in terms of abrasion resistance, these films dispense with the protecting layer on the key top surface such as a UV coating.

According to the invention of the eighth embodiment (see FIGS. 10 to 14), predetermined characters, symbols, etc. are marked by irradiation of a laser beam in the internal portion of each key top made of a resin composition which develops color by laser beam irradiation, these characters, symbols, etc. neither come off nor disappear even by application of friction and the like, realizing excellent abrasion resistance.

Further, all of the steps which are implementable without determination of the destination are finished beforehand. As soon as characters, symbols, etc. related to the destination are defined, marking of the characters, symbols, etc. specific to the language of the destination are applied by means of laser beam irradiation onto the top faces of key tops together with numerical characters and the like which are not related to the relevant language to complete the entire process. Therefore, the key unit can be completed in a shortest period of time after determination of the destination.

According to the constitution of the key unit of the invention of the ninth embodiment (see FIGS. 15 to 17), by irradiating a laser beam onto the top face of each key top, necessary characters, symbols, etc. are marked inside a multilayer film covering each key top, so that these characters, symbols, etc. neither come of nor disappear even by application of friction and the like, realizing excellent abrasion resistance.

According to the production process of the present invention, all of the steps implementable without determination of the destination are finished beforehand to provide a semi-finished product. As soon as those elements of characters, symbols, etc. which are related to the destination are defined, marking of the necessary characters, symbols, etc. are applied by means of laser beam irradiation onto the top faces of key tops to complete the entire process. Therefore, the key unit can be completed in a shortest period of time after determination of the destination.

According to the invention of the tenth embodiment (see FIGS. 18 to 21), characters, symbols, etc. are engraved by means of blasting on the top face of each glass key top which is excellent in transparency, surface hardness and abrasion resistance each as a pattern formed by an assemblage of fine protrusions and indentations (grains) to give a fancy appearance. Since such grainy patterns neither come off nor disappear, exhibiting excellent abrasion resistance.

According to this invention, all of the steps which are implementable without determination of the destination are finished beforehand. As soon as those elements of characters, symbols, etc. which are related to the destination are defined, marking of the characters, symbols, etc. related to the destination are applied by means of blasting against the top faces of the glass key tops to complete the entire process. Therefore, the key unit can be completed in a shortest period of time after determination of the destination.

According to the invention of the eleventh embodiment (see FIGS. 18 to 21), characters, symbols, etc. are engraved on the top face of each hard resin key top which is excellent in transparency, surface hardness and abrasion resistance by means of blasting each as a pattern formed by an assemblage of fine protrusions and indentations (grains) to give a fancy appearance. Since such grainy patterns neither come off nor disappear, exhibiting excellent abrasion resistance.

According to this invention, all of the steps which are implementable without determination of the destination are finished beforehand. As soon as those elements of characters, symbols, etc. which are related to the destination are defined, marking of these characters, symbols, etc. related to the destination are applied by means of maskless blasting onto the top faces of the respective hard resin key tops to complete the entire process. Therefore, the key unit can be completed in a shortest period of time after determination of the destination.

The invention claimed is:

1. A process for producing a key unit, comprising:

assembling the key unit, which includes a resin key top made of a light-transmitting material;

interrupting or stopping the process for producing the key unit once all steps in the process, including the assembling, which are implementable without determination of a destination of the key unit are finished, wherein said assembling comprises applying generic markings not specific to the destination to a back face of the key top; and after the destination is determined and specific markings, which are specific to a language related to the determined destination, are defined, applying the specific markings to a top face of the key top to complete the key unit.

2. The process according to claim 1, wherein the specific markings are applied by impregnation printing.

3. The process according to claim 2, wherein the light-transmitting resin is one of a polyethylene terephthalate (PET) resin and a polyacetal (POM) resin, and wherein the impregnation printing is applied directly onto the top face of the resin key top.

4. The process according to claim 2, wherein the light transmitting resin is a polycarbonate (PC) resin, and wherein the impregnation printing is applied to a protecting coating layer formed beforehand on a surface of the resin key top.

5. The process according to claim 2, wherein the resin key top is laminated with a resin film.

6. The process according to claim 1, wherein applying the specific markings comprises:

intermittently irradiating a laser beam having a wavelength of 1064 nm or less in one of the infrared region, the visible region, and the near ultraviolet region, while focusing the laser beam on a desired position inside the key top to form, in the light-transmitting resin, one of an assemblage of a multiplicity of fine carbonized black spots and an assemblage consisting of white spots consisting of a multiplicity of fine cracks or foams.

7. The process according to claim 6, wherein the laser beam is one of: a beam with a wavelength of 1064 nm, which is the fundamental wave of a Nd:YAG laser; a beam with a wavelength of 532 nm, which is the second harmonic wave of the Nd:YAG laser; and a beam with a wavelength of 355 nm, which is the third harmonic wave of the Nd:YAG laser.

8. The process according to claim 1, wherein the key top is made of a light-transmitting plastic, the specific markings are applied as if they are suspended in the light transmitting plastic, and each of the specific markings is one of an assemblage consisting of a multiplicity of fine carbonized black spots and an assemblage of white spots formed by cracking, and is formed by intermittently irradiating to the key top a laser beam having a wavelength of 1064 nm or less in one of the infrared region, the visible region, and the near ultraviolet region, while focusing the laser beam on a desired position inside the key top.

9. The process according to claim 1, wherein the markings include at least one of a character and a symbol.

10. A process for producing an illuminated key unit, comprising:

assembling the key unit, which comprises a light-transmitting glass key top and a key pad made of a light-transmitting rubber or elastomer;

interrupting or stopping the process for producing the key unit once all steps in the process, including the assembling, which are implementable without determination of a destination of the key unit are finished, wherein said assembling comprises applying generic markings not specific to the destination to a back face of the key top; and after the destination is determined and specific markings, which are specific to a language related to the determined destination, are defined, applying the specific markings to a top face of the key top by maskless blasting, which comprises blasting fine abrasive particles at a high speed directly against a top face of the glass key top, to complete the key unit.

11. The process according to claim 10, wherein the markings include at least one of a character and a symbol.

12. A process for producing an illuminated key unit, comprising:

assembling the key unit, which comprises a light-transmitting hard-resin key top and a key pad made of a light-transmitting rubber or elastomer;

interrupting or stopping the process for producing the key unit once all steps, including the assembling, which are implementable without determination of a destination of the key unit are finished, wherein said assembling comprises applying generic markings not specific to the destination to a back face of the key top; and after the destination is determined and specific markings, which are specific to a language related to the determined destination, are defined, applying the specific markings to a top face of the key top by of maskless blasting, which comprises blasting fine abrasive particles at a high speed directly against the top face of the hard resin key top, to complete the key unit.

13. The process according to claim 12, wherein the markings include at least one of a character and a symbol.

* * * * *